(12) United States Patent
Dilworth et al.

(10) Patent No.: US 9,605,700 B2
(45) Date of Patent: Mar. 28, 2017

(54) SYSTEMS AND METHODS FOR IMPROVING BOLTED JOINTS

(71) Applicant: Hendrickson USA, L.L.C., Itasca, IL (US)

(72) Inventors: Damon E. Dilworth, Channahon, IL (US); Michael P. Bloink, Naperville, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 474 days.

(21) Appl. No.: 13/959,810

(22) Filed: Aug. 6, 2013

(65) Prior Publication Data

US 2014/0271032 A1   Sep. 18, 2014

Related U.S. Application Data

(63) Continuation-in-part of application No. 13/834,318, filed on Mar. 15, 2013.

(51) Int. Cl.
*F16B 9/00* (2006.01)
*F16B 5/02* (2006.01)

(52) U.S. Cl.
CPC ....... *F16B 5/0258* (2013.01); *Y10T 403/4682* (2015.01)

(58) Field of Classification Search
CPC .................... F16B 5/0258; Y10T 403/4682
USPC .... 403/233–238, 256, 258–264; 280/124.11, 280/124.116, 124.163, 124.17, 124.175; 267/41, 52, 53, 260
See application file for complete search history.

(56) References Cited

U.S. PATENT DOCUMENTS

| RE17,880 E | 11/1930 | Stoelzlen |
| 2,499,315 A | 2/1950 | Johnson |
| 3,386,724 A * | 6/1968 | Chieger et al. ................. 267/52 |

(Continued)

FOREIGN PATENT DOCUMENTS

| DE | 10 2007 044404 A1 | 3/2009 |
| WO | WO 98/37333 A1 | 8/1998 |

OTHER PUBLICATIONS

International Search Report and Written Opinion for PCT Patent Appl'n. No. PCT/US2014/017575, dated Jan. 13, 2015.

(Continued)

*Primary Examiner* — Daniel P Stodola
*Assistant Examiner* — Nahid Amiri
(74) *Attorney, Agent, or Firm* — Cook Alex Ltd.

(57) ABSTRACT

A mechanical fastener assembly is provided for joining two or more workpieces. The assembly includes a mechanical fastener and a slotted insert. The mechanical fastener has a shaft received within aligned bores of the workpieces. The slotted insert surrounds at least a portion of the shaft and has a body portion received within the aligned bores, while an enlarged head portion of the slotted insert is positioned outside of the bores. The mechanical fastener assembly may further include a retaining sleeve when the bores of the workpieces have different diameters. In such case, a midsection of the retaining sleeve is at least partially received within the bore having the smaller diameter, while an enlarged end section of the retaining sleeve is at least partially received within the bore having the greater diameter. The retaining sleeve may be used in combination with or independently of the slotted insert.

20 Claims, 35 Drawing Sheets

(56) References Cited

U.S. PATENT DOCUMENTS

| | | |
|---|---|---|
| 4,743,138 A | 5/1988 | Goy |
| 5,039,245 A | 8/1991 | Hansen |
| 5,803,686 A | 9/1998 | Erbes et al. |
| 5,921,570 A * | 7/1999 | Lie .................. 280/124.175 |
| 6,352,245 B1 * | 3/2002 | Norden .................. 267/36.1 |
| 6,406,008 B1 * | 6/2002 | Dudding et al. .......... 267/52 |
| 6,540,462 B1 * | 4/2003 | Bretschneider et al. ....... 411/82 |
| 7,207,583 B2 * | 4/2007 | Ross et al. ............. 280/124.121 |
| 7,922,213 B2 * | 4/2011 | Werth .................. 285/243 |
| 7,959,172 B2 * | 6/2011 | Nashawaty et al. ... 280/124.156 |
| 8,136,825 B2 * | 3/2012 | Luna .................. 280/124.175 |
| 2002/0015617 A1 * | 2/2002 | Schwenkel et al. .......... 403/329 |
| 2006/0033298 A1 * | 2/2006 | Longworth et al. ..... 280/124.11 |
| 2007/0297869 A1 | 12/2007 | Kunda |
| 2010/0195944 A1 * | 8/2010 | Verbowski .................. 384/155 |
| 2010/0278608 A1 | 11/2010 | Toosky |
| 2010/0329780 A1 | 12/2010 | Fruh |
| 2011/0285101 A1 * | 11/2011 | Henksmeier et al. ... 280/124.11 |
| 2012/0056469 A1 | 3/2012 | Bubulka et al. |
| 2014/0138929 A1 * | 5/2014 | Wilson et al. ........... 280/124.11 |

OTHER PUBLICATIONS

International Search Report and Written Opinion for PCT Patent Appl'n. No. PCT/US2014/017553, dated Oct. 16, 2014.

Office Communication for U.S. Appl. No. 13/834,318, dated Nov. 13, 2015.

Invitation to Pay Additional Fees and Partial International Search for PCT Patent Appl'n. No. PCT/US2014/017575, dated Oct. 23, 2014.

Office Communication, U.S. Appl. No. 13/834,318, dated Aug. 7, 2015.

Office Communication for U.S. Appl. No. 13/834,318, dated Mar. 21, 2016.

* cited by examiner

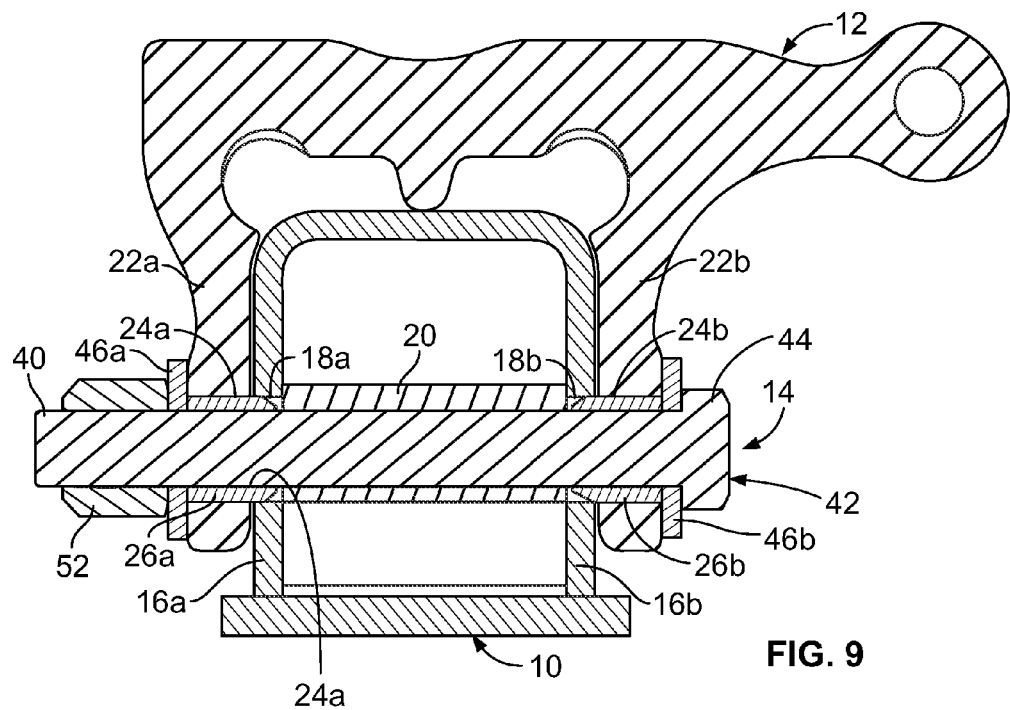
FIG. 9
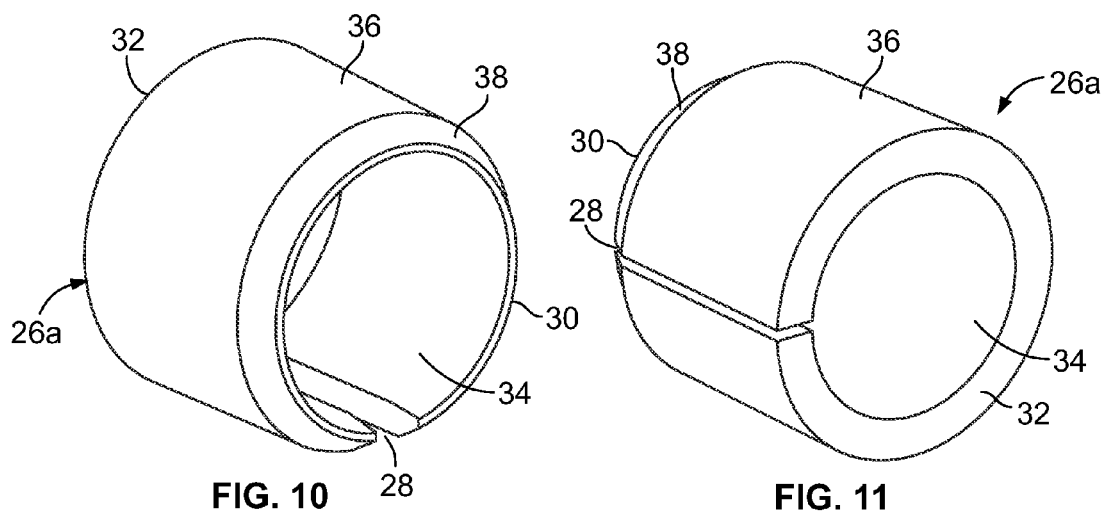
FIG. 10
FIG. 11

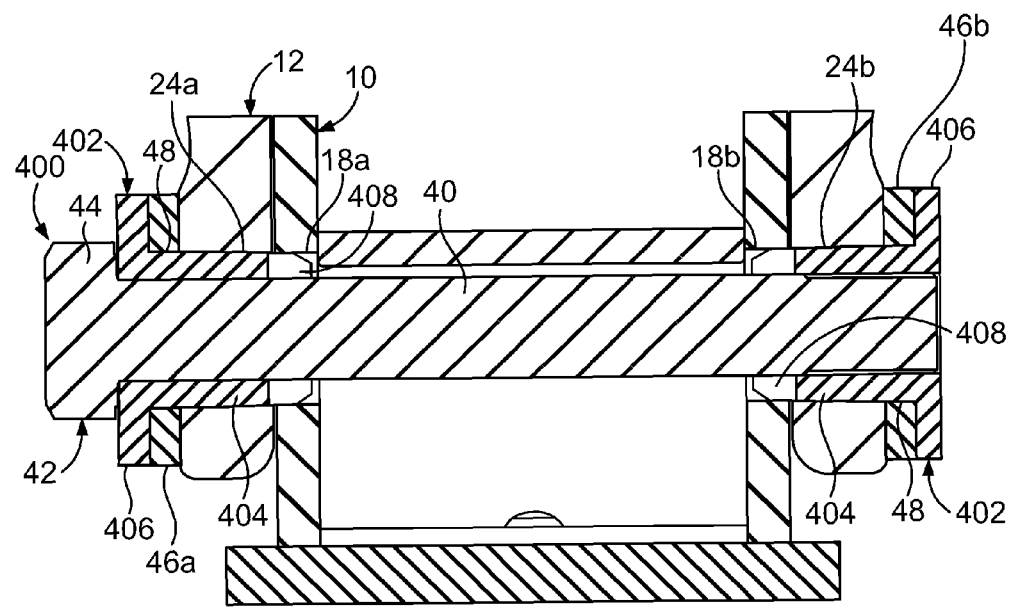
FIG. 34
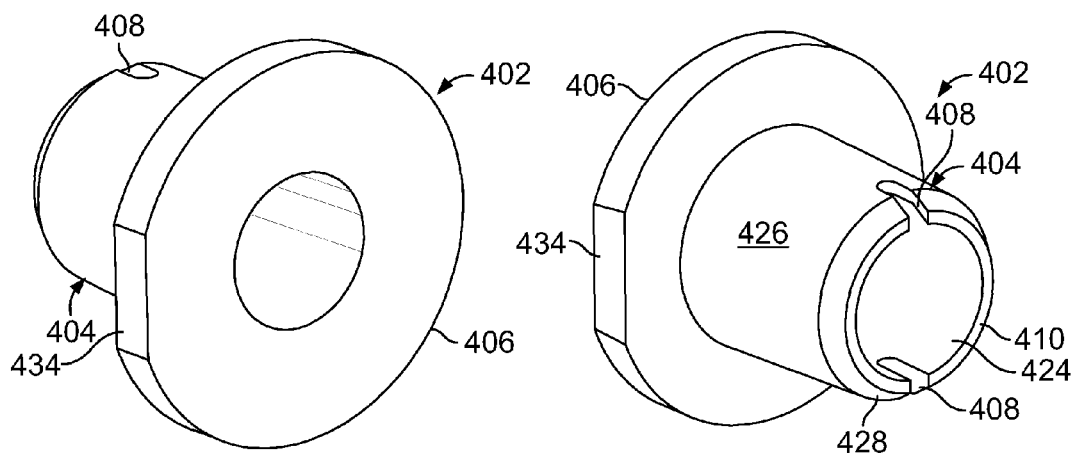
FIG. 35  FIG. 36

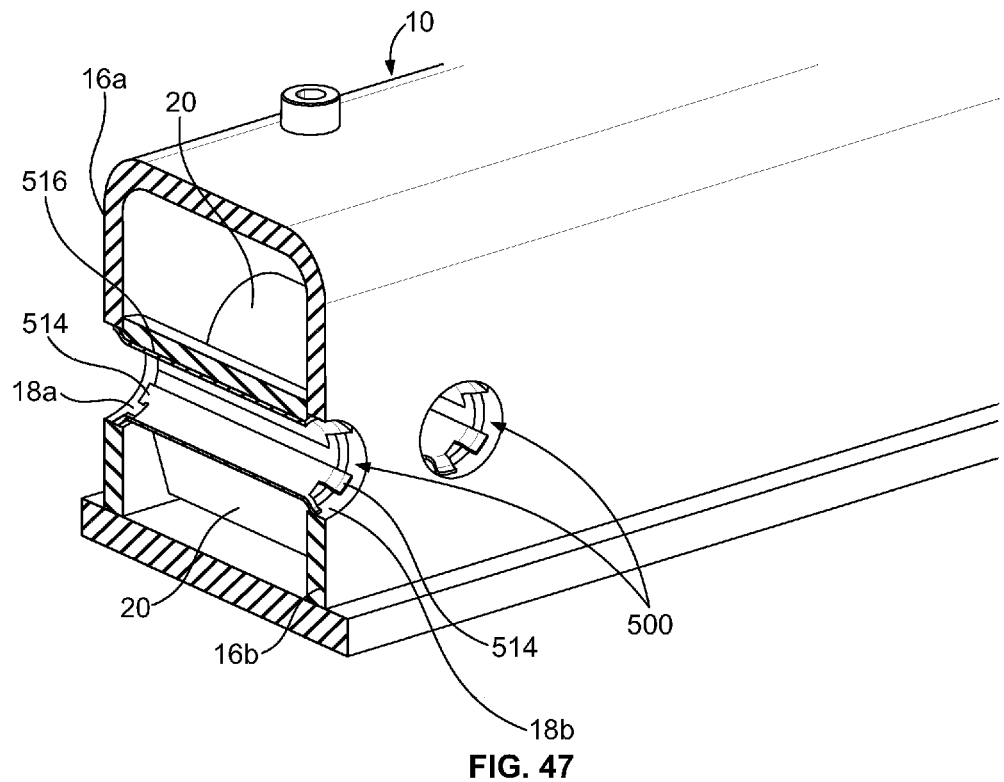
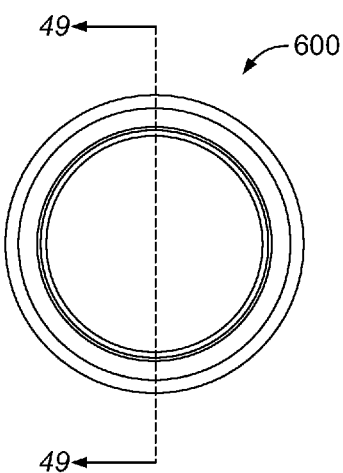
FIG. 48
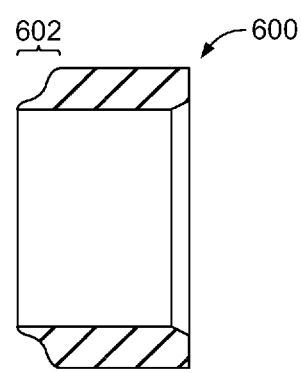
FIG. 49
FIG. 47

SYSTEMS AND METHODS FOR IMPROVING BOLTED JOINTS

CROSS REFERENCE TO RELATED APPLICATIONS

The present application is a continuation-in-part application of U.S. patent application Ser. No. 13/834,318, filed on Mar. 15, 2013, which is hereby incorporated by reference in its entirety.

FIELD OF THE DISCLOSURE

The present subject matter relates to bolted joints. More particularly, the present subject matter relates to methods and systems for strengthening bolted joints.

DESCRIPTION OF RELATED ART

It is well known to secure two or more components of an assembly together using mechanical fasteners. Among the typical mechanical fasteners used, which depend upon a number of factors, are bolts and rivets. Each type of mechanical fastener has strengths and weaknesses. Compared to a rivet, a bolt is typically much easier to service, as it is typically readily inserted and removed as required, whereas rivets are typically not intended to be removed and serviced. In contrast, a riveted joint is typically stronger than a bolted joint, as a bolt merely creates friction between the joined components to secure the joint, whereas a rivet creates a stronger shear joint. As such, a relatively great number of bolts and/or relatively heavy bolts must be employed to create a joint that is comparable to a joint secured with fewer and/or lighter rivets.

As both bolts and rivets have their disadvantages, it would be advantageous to be able to provide a mechanical fastener capable of creating a joint with serviceability comparable to a bolt and strength comparable to a rivet.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a mechanical fastener assembly is provided for securing first and second workpieces having aligned bores. The mechanical fastener assembly includes a mechanical fastener and a slotted insert. The mechanical fastener has a shaft configured to be at least partially received within the aligned bores of the first and second workpieces. The slotted insert surrounds at least a portion of the shaft of the mechanical fastener and has a body portion and an enlarged head portion. The body portion is configured to be at least partially received within the aligned bores of the first and second workpieces, while the head portion is configured to be positioned outside of the bores. An inner surface of the slotted insert is configured to engage at least a portion of the shaft of the mechanical fastener and an outer surface of the body portion of the slotted insert is configured to engage at least a portion of the aligned bores of the first and second workpieces.

In another aspect, a joint comprises first and second workpieces, a mechanical fastener, and a slotted insert. The first workpiece has a first bore and the second workpiece has a second bore aligned with the first bore. The mechanical fastener has a shaft at least partially received within the aligned bores of the first and second workpieces. The slotted insert surrounds at least a portion of the shaft of the mechanical fastener and has a body portion and an enlarged head portion. The body portion is at least partially received within the aligned bores of the first and second workpieces, while the head portion is positioned outside of the bores. An inner surface of the slotted insert engages at least a portion of the shaft of the mechanical fastener and an outer surface of the body portion of the slotted insert engages at least a portion of the aligned bores of the first and second workpieces.

In yet another aspect, a retaining sleeve is provided for securing first and second workpieces having aligned bores with different diameters. The retaining sleeve includes a generally tubular midsection and an enlarged end section. The midsection defines an axially extending gap and is configured to be at least partially received within the bore having the smaller diameter. The end section has a greater diameter than the midsection and is configured to be at least partially received within the bore having the greater diameter.

BRIEF DESCRIPTION OF THE DRAWINGS

FIGS. 4-9 are side elevational views showing a process of joining the vehicle axle and suspension system component of FIG. 1 using the mechanical fastener assembly of FIG. 1;

FIGS. 10 and 11 are perspective views of a slotted collar of the mechanical fastener assembly of FIG. 1;

FIG. 34 is a cross-sectional view of the vehicle axle, suspension system component, and mechanical fastener assembly of FIG. 33;

FIGS. 35 and 36 are perspective views of a slotted insert of the mechanical fastener assembly of FIG. 32;

FIG. 47 is a cross-sectional, perspective view of the vehicle axle of FIG. 1, with the retaining sleeve of FIG. 42 received within bores of the vehicle axle;

FIG. 48 is a top plan view of an expander member;

FIG. 49 is a cross-sectional view of the expander member of FIG. 48, taken through the line 49-49 of FIG. 48.

DESCRIPTION OF THE ILLUSTRATED EMBODIMENTS

The embodiments disclosed herein are for the purpose of providing the required description of the present subject matter. They are only exemplary, and may be embodied in various forms and in various combinations. Therefore, specific details disclosed herein are not to be interpreted as limiting the subject matter as defined in the accompanying claims.

Figure 1:
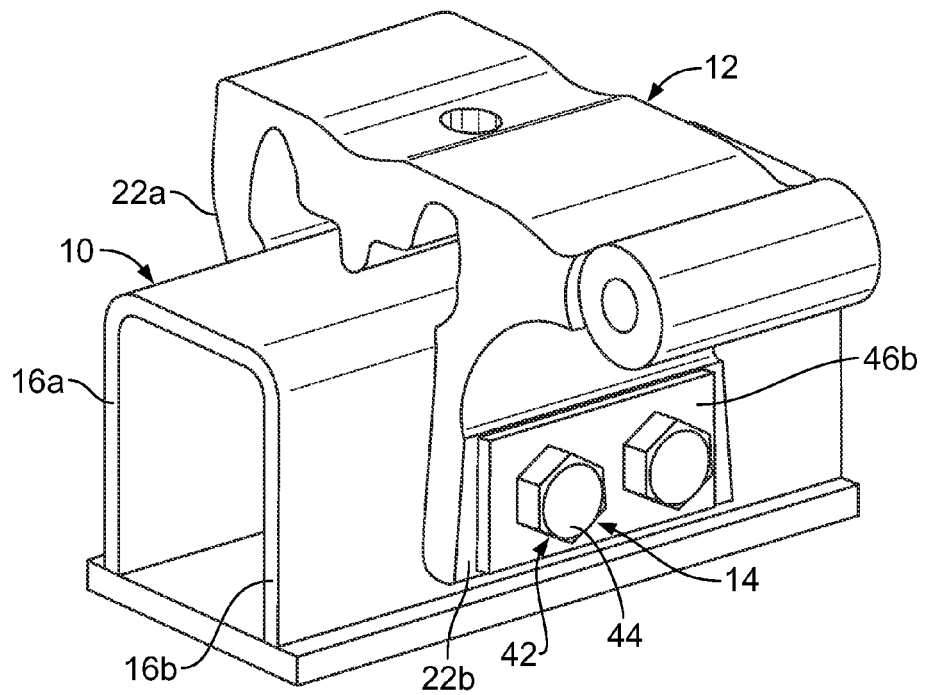
FIG. 1 is a perspective view of two workpieces, shown as a vehicle axle and suspension system component, secured together by a mechanical fastener assembly according to an aspect of the present disclosure.
Figure 2:
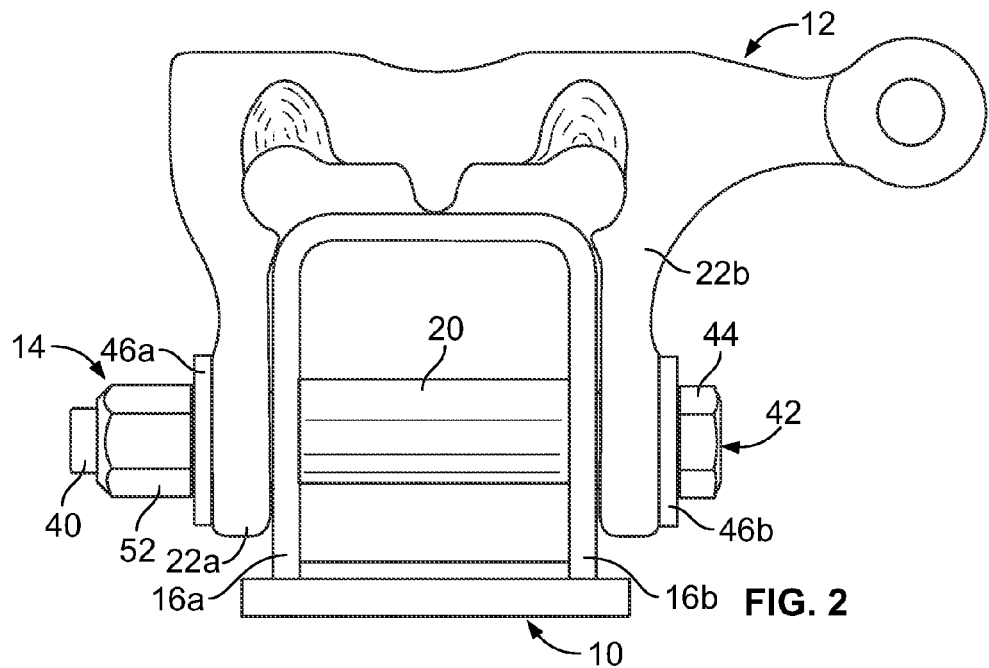
FIG. 2 is a side elevational view of the vehicle axle, suspension system component, and mechanical fastener assembly of FIG. 1.
Figure 3:
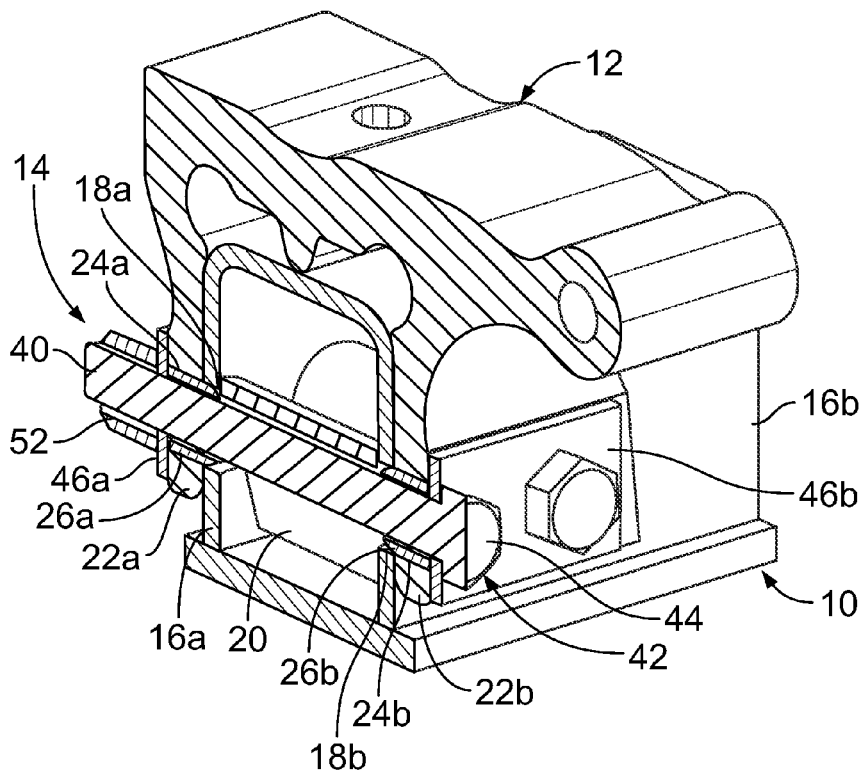
FIG. 3 is a cross-sectional view of the vehicle axle, suspension system component, and mechanical fastener assembly of FIG. 1.
Figure 4:
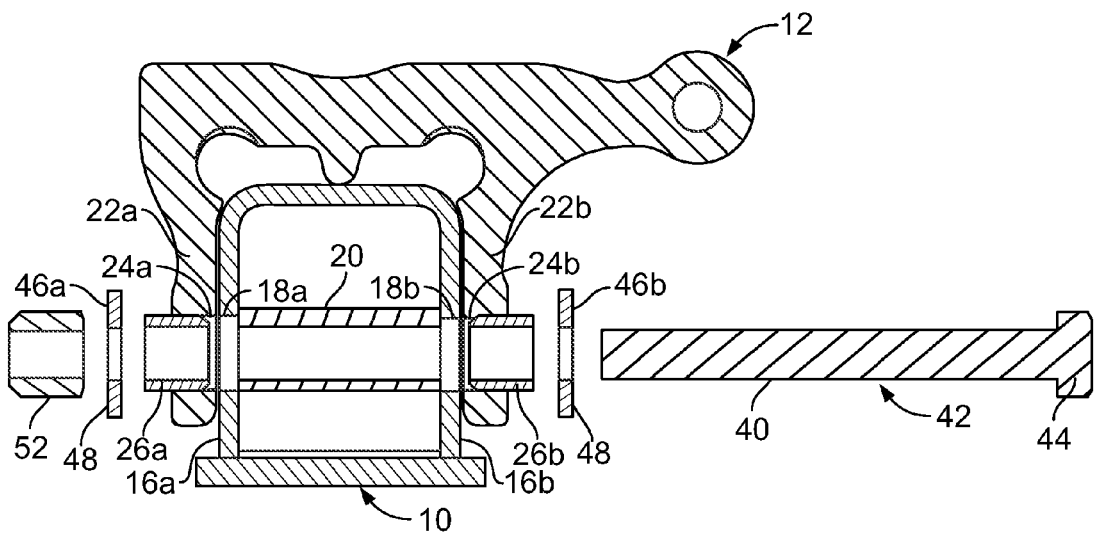

FIGS. 1-3 show a first workpiece 10 and a second workpiece 12 that are joined by a mechanical fastener assembly 14 according to an aspect of the present disclosure. FIGS. 4-9 show an exemplary method of joining the workpieces 10 and 12 using the mechanical fastener assembly 14. In the illustrated embodiment, the first workpiece 10 comprises a vehicle axle and the second workpiece 12 comprises an axle wrap or suspension system component, but mechanical fastener assemblies according to the present disclosure may be employed to join together any of a variety of suitable workpieces. Thus, it should be understood that the workpieces described and illustrated herein are merely exemplary, and that the assemblies and methods described herein may be used in combination with other workpieces without departing from the scope of the present disclosure.

Each workpiece 10 and 12 is provided with a bore or through-hole or aperture for receipt of at least a portion of the mechanical fastener assembly 14, as can be seen in FIGS. 4-9. In the illustrated embodiment, the workpieces 10 and 12 are joined together at multiple locations, such that each workpiece 10, 12 includes a plurality of bores, with multiple mechanical fastener assemblies 14 being employed; however, it is also within the scope of the present disclosure for each workpiece to include only one bore or through-hole or aperture and to join the workpieces using a single mechanical fastener assembly.

Figure 16:
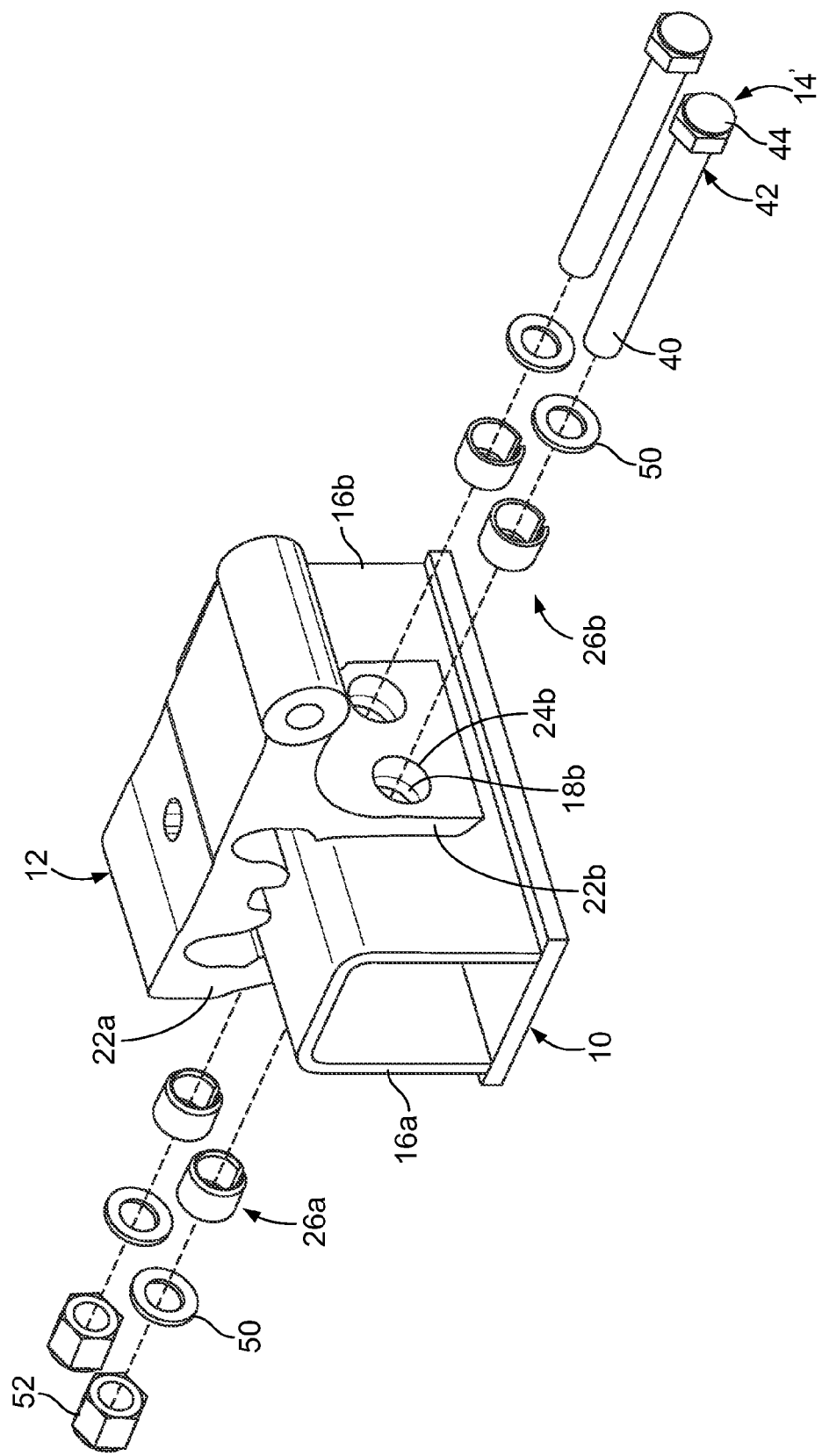
FIG. 16 is an exploded view of the vehicle axle and suspension system component of FIG. 1, shown with an alternative embodiment of a mechanical fastener assembly according to the present disclosure.
Figure 17:
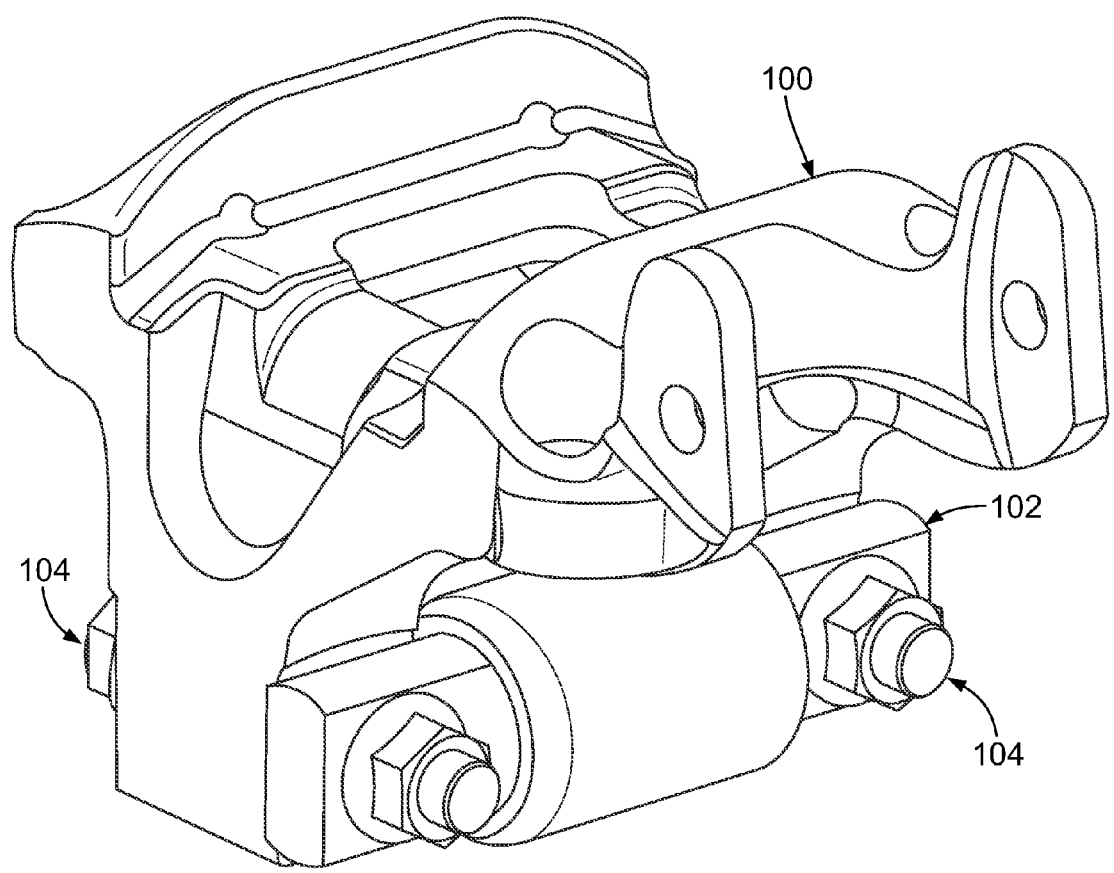
FIG. 17 is a front perspective view of two different workpieces, shown as a bottom cap and D-pin bushing of a vehicle suspension system, secured together by a mechanical fastener assembly according to an aspect of the present disclosure.
Figure 18:
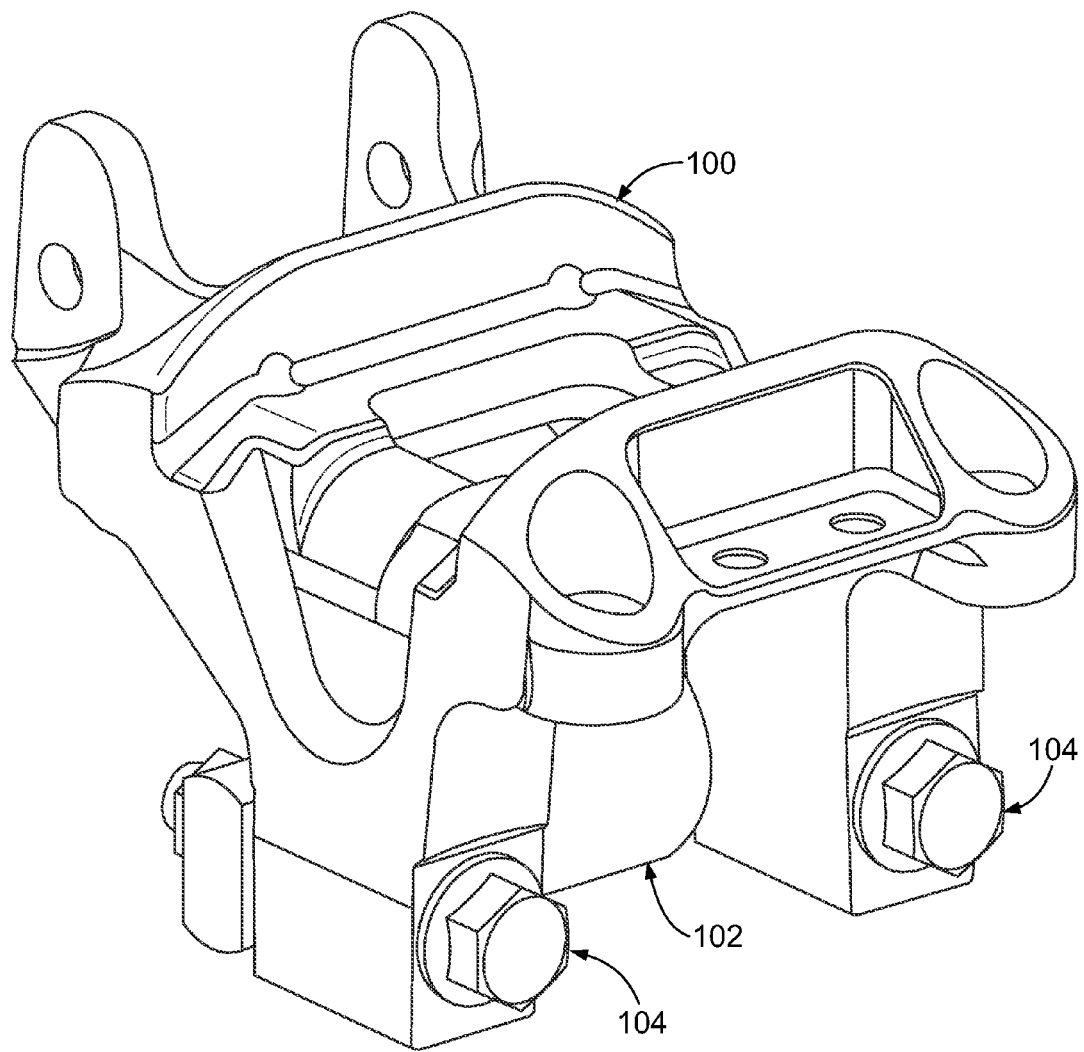
FIG. 18 is a rear perspective view of the bottom cap, D-pin bushing, and mechanical fastener assembly of FIG. 17.

More particularly, in the illustrated embodiment, the axle or first workpiece 10 includes a pair of generally parallel vertical walls 16a and 16b, with each vertical wall 16a, 16b including a bore 18a, 18b that is substantially aligned with the bore of the other wall. As best seen in FIG. 16, each vertical wall 16a, 16b may include a plurality of bores, with each bore being substantially aligned with a bore defined in the other vertical wall. As shown in FIGS. 2-9, each pair of bores may include a rigid brace 20 extending between the vertical walls 16a and 16b for preventing deformation of the vertical walls 16a and 16b when a force is applied thereto by a mechanical fastener assembly 14 during the joinder process, as will be described in greater detail herein.

Similar to the first workpiece 10, the axle wrap or second workpiece 12 also includes a pair of generally parallel vertical walls 22a and 22b, with each vertical wall 22a, 22b including a bore 24a, 24b that is substantially aligned with the bore of the other wall. Further, each vertical wall 22a, 22b may include a plurality of bores, with each bore being substantially aligned with a bore defined in the other vertical wall.

Prior to joinder, each vertical wall of the first workpiece 10 is positioned adjacent to and/or in contact with an associated vertical wall of the second workpiece 12, with each bore of the first workpiece 10 being positioned directly adjacent to and in alignment with a bore of the second workpiece 12. More particularly, bores 18a and 24a are positioned directly adjacent to and in alignment with each other, while bores 18b and 24b are positioned directly adjacent to and in alignment with each other (FIGS. 4-9). In the illustrated embodiment, these four bores 18a, 18b, 24a, and 24b are positioned in alignment with each other, although not necessarily directly adjacent to each other.

With the first and second workpieces 10 and 12 properly aligned, one or more components of the mechanical fastener assembly 14 may be inserted into the bores. According to one method of joining the first and second workpieces 10 and 12, a slotted collar 26a, 26b of the mechanical fastener assembly 14 is partially inserted into each pair of adjacent, aligned bores. One of the slotted collars 26a is shown in greater detail in FIGS. 10-13, but it should be understood that the other slotted collar 26b may be substantially identical. In other embodiments, two slotted collars of a single mechanical fastener assembly may be differently configured or, if there is only one set of adjacent, aligned bores, a mechanical fastener assembly may include only one slotted collar.

Figure 12:
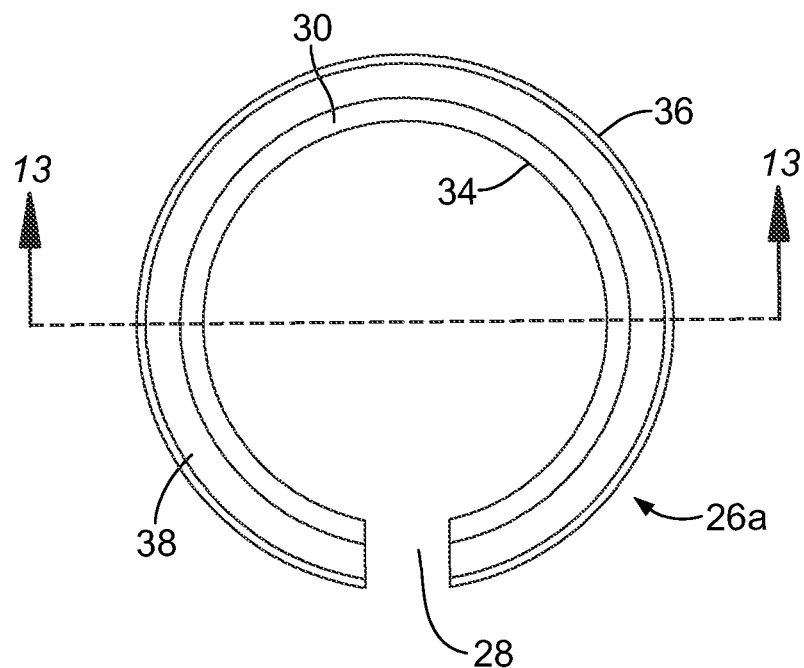
FIG. 12 is a top plan view of the slotted collar of FIG. 10.
Figure 13:
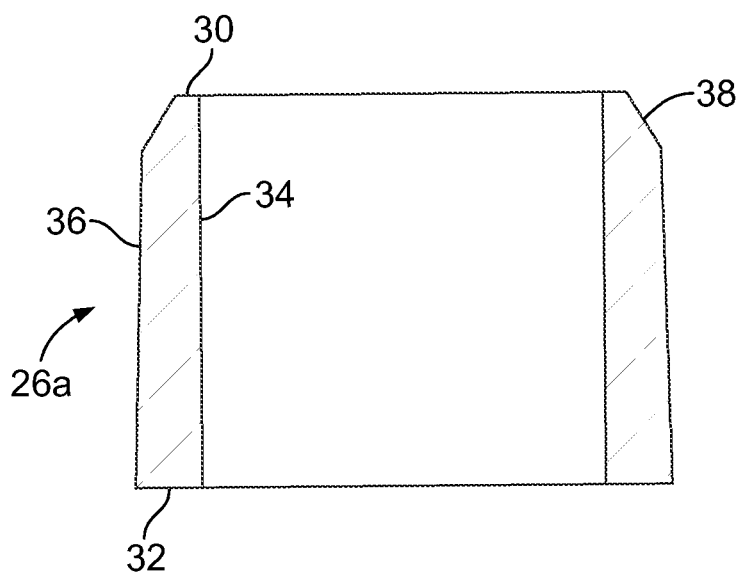
FIG. 13 is cross-sectional view of the slotted collar of FIG. 10, taken through the line 13-13 of FIG. 12.

As shown in greater detail in FIGS. 10-12, the slotted collar 26a may be generally annular, with a slot 28 defined in the wall of the slotted collar 26a to prevent the slotted collar 26a from defining a complete 360° ring. The illustrated slot 28 is substantially parallel to a central axis of the slotted collar 26a and extends between the ends 30 and 32 of the slotted collar 26a, but it is also within the scope of the present disclosure for the slot to be oriented at an angle with respect to the central axis of the slotted collar. In other embodiments, the slot may extend only part of the way between the ends of the slotted collar and/or have a varying width, rather than the substantially uniform width shown in the illustrated embodiment. It is also within the scope of the present disclosure for the slot to be relatively narrow or thin, as in the illustrated embodiment, or to be relatively wide, thereby limiting the arcuate extent of the wall of the slotted collar.

In the illustrated embodiment, the inner surface 34 of the slotted collar 26a has a substantially uniform diameter, while the outer surface 36 of the slotted collar 26a has a non-uniform diameter. In particular, the outer surface 36 of the illustrated slotted collar 26a is tapered to define a generally frusto-conical surface with a greater diameter at one end 32 than at the other end 30. The end 30 of the slotted collar 26a having the smaller outer diameter is referred to herein as the "lead-in end," as it is the end of the slotted collar that is preferably first inserted into the aligned bores of the workpieces, as will be described in greater detail herein.

In one embodiment, the outer surface 36 is tapered at approximately 1.5° with respect to the central axis of the slotted collar 26a, such that the outer surface 36 has a maximum diameter at one end 32 that gradually decreases in the direction of the other end 30. In other embodiments, the outer surface of the slotted collar may be tapered at a different angle or at a varying angle. It is also within the scope of the present disclosure for the outer surface of the slotted collar to be substantially un-tapered and to have a substantially uniform diameter or to have a diameter that varies without being tapered (e.g., having a stepped outer surface).

According to an aspect of the present disclosure that may be employed in combination with or separately from the above-described taper, one end 30 may include a chamfer 38. If provided in combination with a tapered outer surface 36 (as in the illustrated embodiment), it is preferable for chamfer 38 to be associated with the lead-in end 30 for improved performance when the slotted collar 26a is inserted into aligned bores, as will be described in greater detail herein. In other embodiments, where the diameter of the outer surface of the slotted collar is substantially uniform except in the location of the chamfer, it may be advantageous for the chamfered end to be inserted first into the aligned bore, as a chamfer provides the slotted collar with a self-alignment feature during insertion.

Turning back now to FIG. 4, the slotted collars 26a and 28b are at least partially inserted into the aligned bores, preferably with the lead-in end 30 first. If the outer surface of a slotted collar is tapered, it is preferable for at least a portion of the associated aligned bores to also be tapered. Most preferably, the associated set of aligned bores have a taper that matches the tapered outer surface of the slotted collar (e.g., with the aligned bores defining an approximately 1.5° taper when the outer surface of the slotted collar is tapered at approximately 1.5°). On the other hand, if the outer surface of a slotted collar is un-tapered, it is preferable for the associated aligned bores to also be un-tapered or to have a substantially uniform diameter. Preferably, at least a portion of the outer surface of the slotted collars 26a and 26b has a greater diameter than the associated set of aligned bores (for reasons that will be described in greater detail herein), in which case a tapered slotted collar and set of aligned bores may be preferred to an un-tapered slotted collar and aligned bores to the extent that it may be easier to partially insert a tapered slotted collar into a tapered set of aligned bores.

Figure 5:
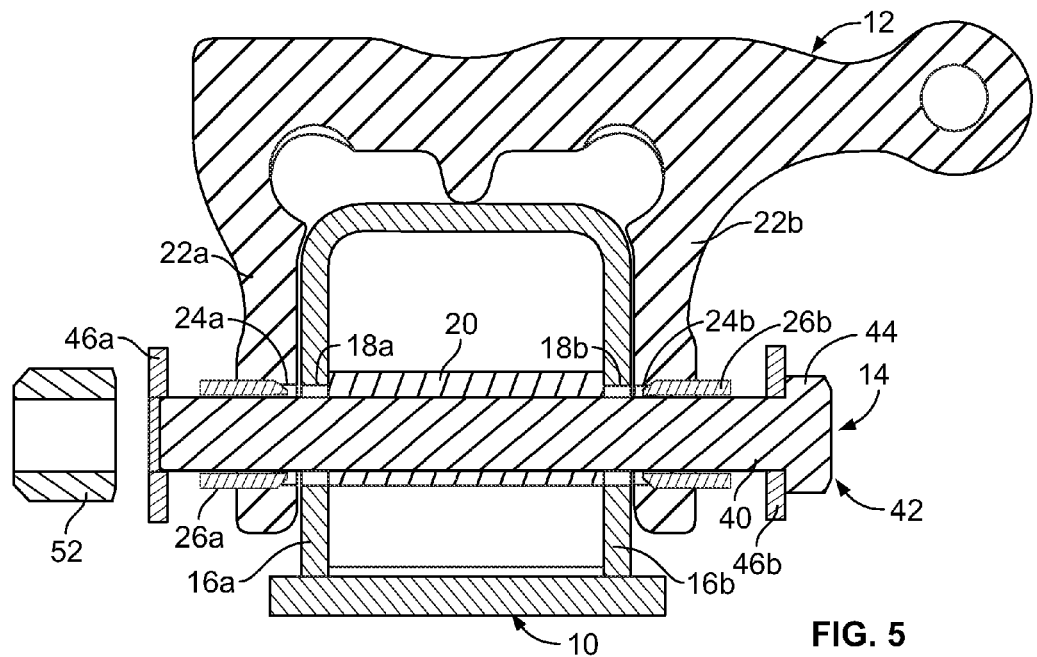

With the slotted collars 26a and 26b in place, other components of the mechanical fastener assembly 14 may be inserted into the aligned bores. In particular, the shaft or shank or elongated body 40 of a mechanical fastener 42 may be at least partially inserted into the aligned bores, as shown in FIG. 5. In the illustrated embodiment, the mechanical fastener 42 comprises a bolt, with a shaft 40 having an enlarged head or end piece 44 associated with one of its ends according to conventional design, but other mechanical fasteners having a shaft or shank or elongated body (e.g., a screw or tube) may also be used without departing from the scope of the present disclosure. The shaft 40 has a smaller outer diameter than the minimum inner diameter of the associated set of aligned bores, and may have a smaller outer diameter than the minimum inner diameter of the associated slotted collar or collars 26a, 26b, such that at least a portion of the shaft 40 is surrounded by or received within the collar(s). In such a configuration (as illustrated in FIG. 5), there is a gap between the outer surface of the shaft 40 and the aligned bores, with the slotted collar or collars 26a, 26b occupying at least a portion of that gap. Although the shaft 40 of the mechanical fastener 42 is shown as being inserted into the aligned bores after the slotted collars 26a and 26b, it is also within the scope of the present disclosure for the shaft to be inserted prior to or substantially at the same time as a slotted collar is inserted into a set of aligned bores.

With the shaft 40 of the mechanical fastener 42 at least partially inserted into the aligned bores, one or both of the slotted collars 26*a*, 26*b* may be further advanced into the associated set of aligned bores. If the outer surface of a slotted collar is tapered and/or includes a chamfered end, such a configuration may provide a self-centering or aligning feature as the slotted collar is further advanced into the adjacent, aligned bores. In the illustrated embodiment, the mechanical fastener assembly 14 is provided with a pair of rigid plates 46*a* and 46*b*, with one rigid plate 46*a* positioned adjacent to one of the slotted collars 26*a* and the other rigid plate 46*b* positioned adjacent to the other slotted collar 26*b* to contact the associated slotted collar and press it further into the associated set of aligned bores. Each rigid plate 46*a*, 46*b* includes a bore or through-hole or aperture 48 (FIG. 4) configured to receive the shaft 40 of the associated mechanical fastener 42. If multiple mechanical fasteners are provided (as in the illustrated embodiment), each rigid plate 46*a*, 46*b* may include one bore or through-hole or aperture for each mechanical fastener. Preferably, the bore 48 of the rigid plate or plates 46*a* and 46*b* have a diameter substantially the same as or slightly greater than the outer diameter of the shaft 40 of the associated mechanical fastener 42, such that the shaft 40 may pass through the bore 48 of rigid plate or plates 46*a* and 46*b*, but the associated slotted collar 26*a*, 26*b* cannot. In other embodiments, the rigid plate or plates may be differently configured (e.g., substantially annular rigid members or washers 50, as in FIG. 16) or the mechanical fastener assembly may be provided without a rigid plate. It may be preferable, however to provide a washer 50 or rigid plate 46*a*, 46*b* or the like in order to provide a substantially smooth contact surface for the end 32 of the slotted collar or collars 26*a* and 26*b* and/or to distribute any force applied to the workpieces 10 and/or 12 by the mechanical fastener 42 over a larger area.

Figure 6:
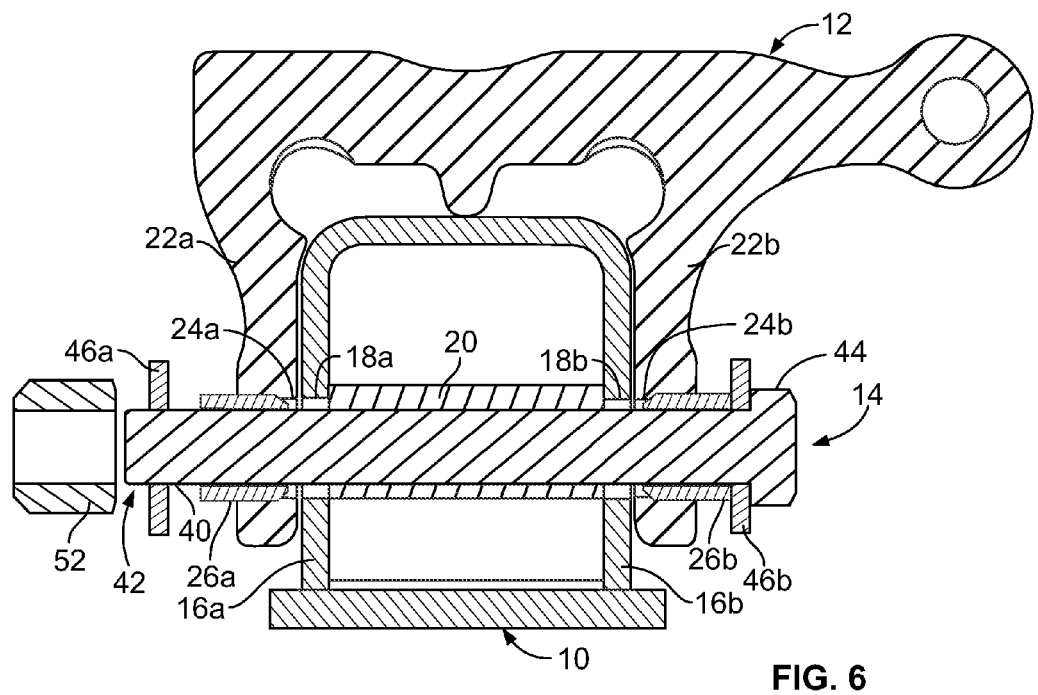
Figure 7:
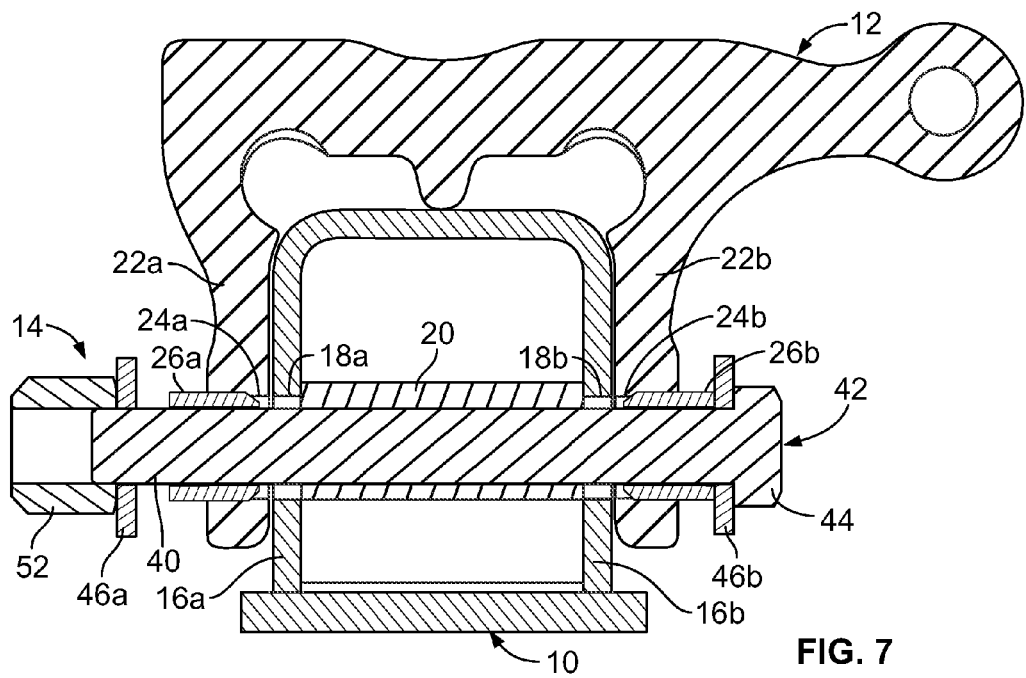
Figure 8:
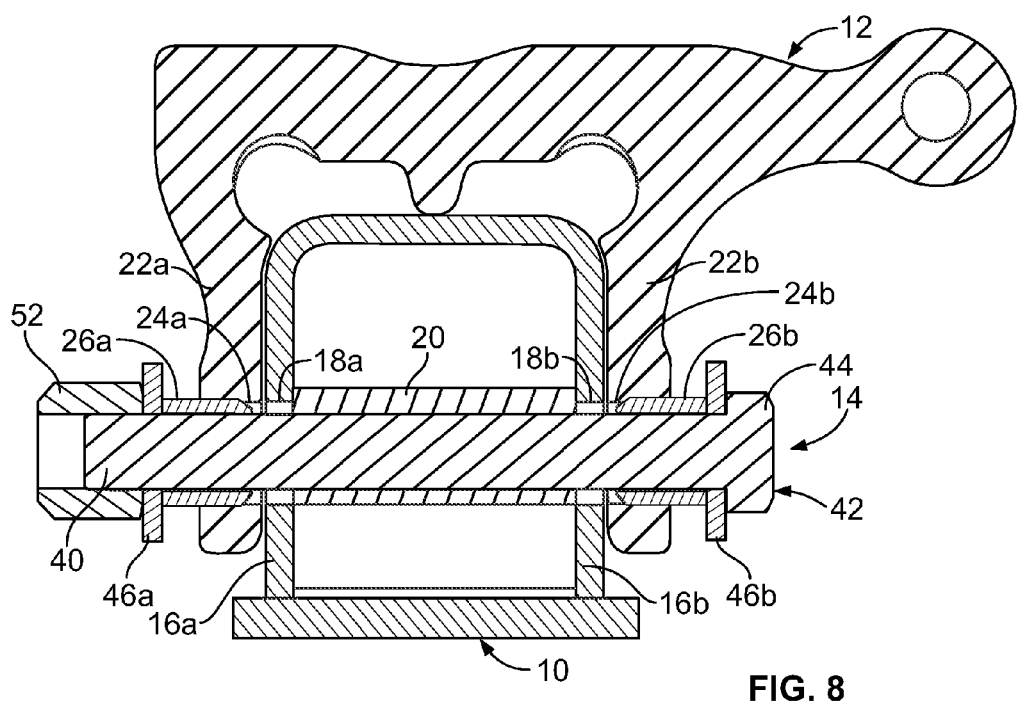

If the mechanical fastener 42 is provided as a bolt, as in the illustrated embodiment, a second enlarged end piece or nut 52 may be provided for connection to the end of the bolt opposite the bolt head 44. As shown in FIGS. 6-8, the nut 52 contacts one of the rigid plates 46*a* to move it along the shaft 40 and into contact with one of the slotted collars 26*a*, while the bolt head 44 contacts the other rigid plate 46*b* to move it into contact with the other slotted collar 26*b*. In the illustrated embodiment, tightening the nut 52 (FIGS. 7 and 8) brings the bolt head 44 and the nut 52 closer together, thereby pressing the rigid plates 46*a* and 46*b* against the slotted collars 26*a* and 26*b*, respectively, which are advanced further into the associated set of aligned bores until the rigid plates 46*a* and 46*b* contact the associated vertical walls 22*a* and 22*b* of the second workpiece 12 (FIG. 9). If provided, the brace 20 positioned between the vertical walls 16*a* and 16*b* of the first workpiece 10 helps to prevent deformation of the vertical walls 16*a*, 16*b*, 22*a*, and 22*b* when the nut 52 is tightened onto the mechanical fastener 42. While the slotted collars 26*a* and 26*b* are fully received within the associated aligned bores in the final configuration of FIG. 9, it is also within the scope of the present disclosure for a slotted collar to be only partially received within a set of aligned bores in a final configuration.

At least a portion of the outer surface of the slotted collar or collars 26*a* and 26*b* has a greater diameter than the associated set of aligned bores, such that fully pressing each slotted collar into its associated set of aligned bores causes the slot of the slotted collar to at least partially close, thereby decreasing the outer and inner diameters of the slotted collar. The slot 28, therefore, gives the slotted collar 26*a*, 26*b* improved flexibility to be usable in a variety of different applications, as the slot 28 effectively adjusts to a variety of tolerances between the bores and the shaft 40 of the mechanical fastener 42, as well as any other surfaces in the bores.

Preferably, the slotted collar or collars 26*a* and 26*b* are configured such that the associated set of aligned bores presses the slotted collar 26*a*, 26*b* into contact with the shaft 40 of the mechanical fastener 42, thereby placing at least a portion of the inner surface 34 of the slotted collar 26*a*, 26*b* into contact or engagement with the shaft 40 of the mechanical fastener 42 and placing at least a portion of the outer surface 36 of the slotted collar 26*a*, 26*b* into contact or engagement with the associated aligned bores. By contacting both the shaft 40 of the mechanical fastener 42 and the aligned bores, the slotted collar or collars 26*a* and 26*b* create a shear joint to secure the workpieces 10 and 12 together, effectively transforming a bolted joint into a riveted joint. Employing a shear joint instead of a bolted joint allows for a sufficiently strong connection between the workpieces 10 and 12 using fewer and lighter mechanical fasteners than would be necessary in a bolted joint connecting the workpieces 10 and 12. Preferably, all or a large percentage of the inner surface 34 of the slotted collar or collars 26*a* and 26*b* contacts the shaft 40, while all or a large percentage of the outer surface 36 of the slotted collar or collars 26*a* and 26*b* contacts the aligned bores to create a stronger shear joint.

Preferably, the slotted collar or collars 26*a* and 26*b* are configured to elastically deform to the final configuration of FIG. 9, rather than inelastically or permanently deforming. By such a configuration, the mechanical fastener assembly 14 may be used to create a shear joint (as described above), while still being fully removable from the workpieces 10 and 12 for servicing. In one embodiment, the slotted collar or collars 26*a* and 26*b* are formed of a metal material, such as steel (e.g., 1008-1050 steel in a preferred embodiment), but other materials may also be used without departing from the scope of the present disclosure.

Figure 14:
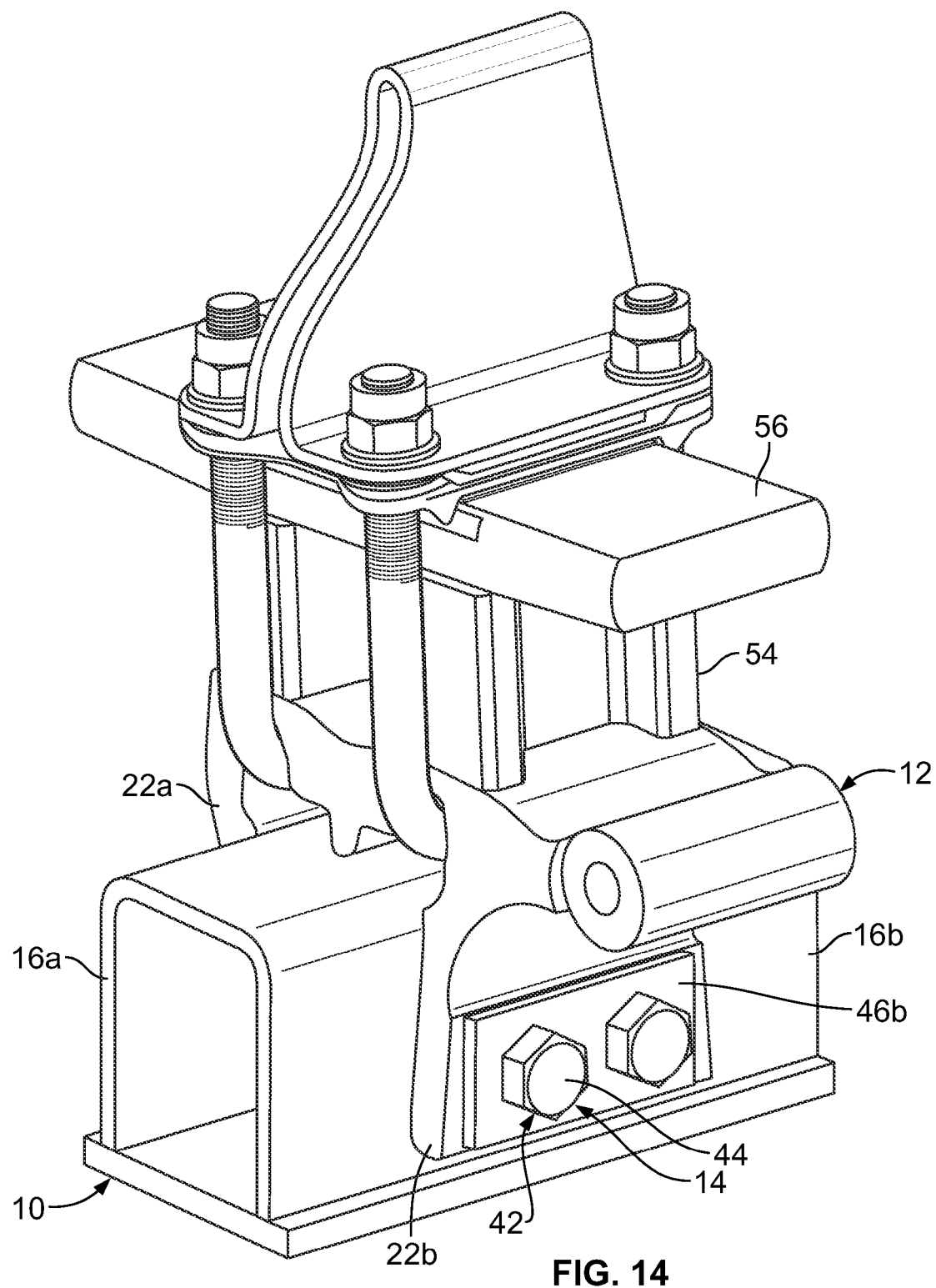
FIG. 14 is a perspective view of the vehicle axle, suspension system component, and mechanical fastener assembly of FIG. 1, showing additional components of the suspension system.
Figure 15:
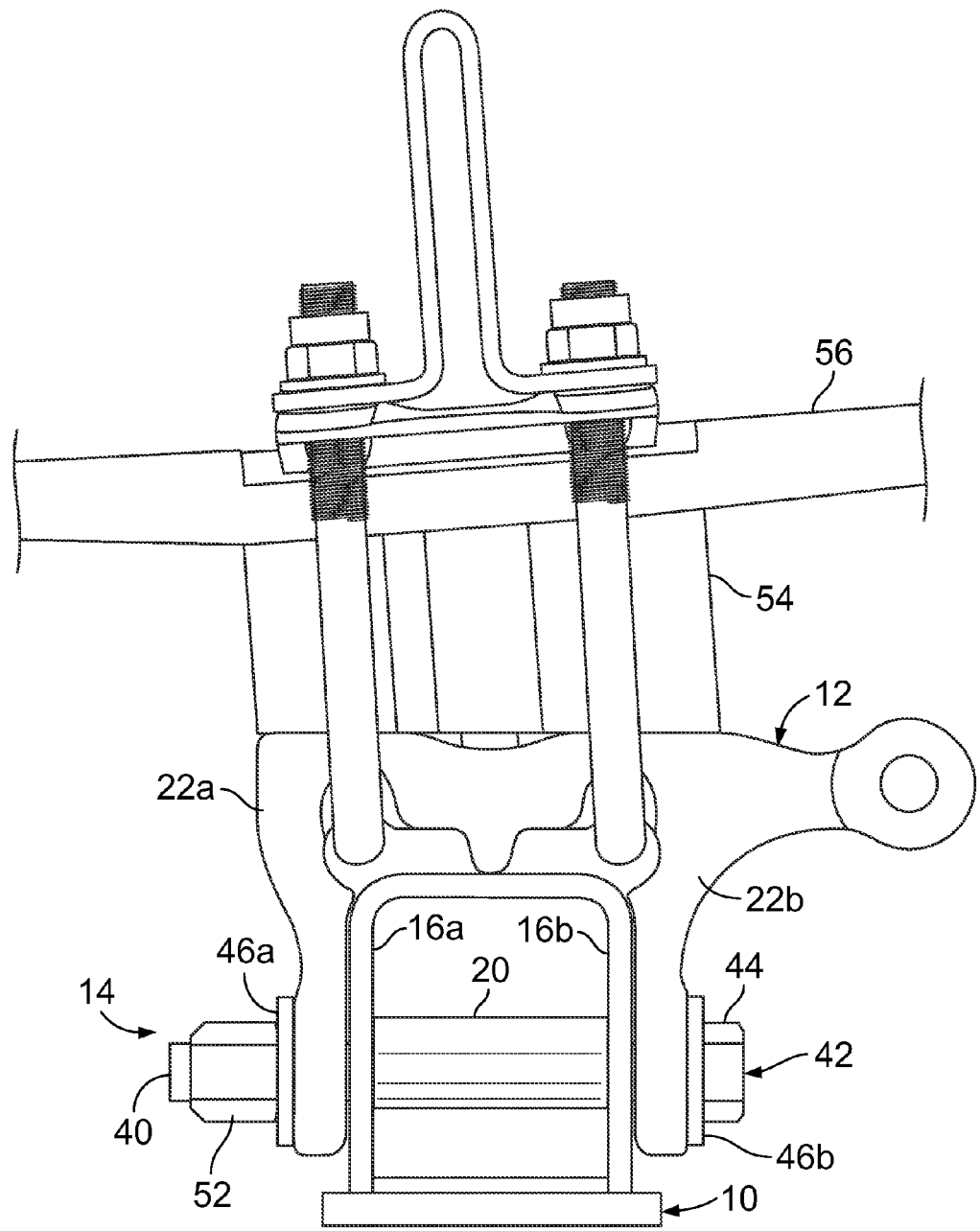
FIG. 15 is a side elevational view of the vehicle axle, suspension system components, and mechanical fastener assembly of FIG. 14.

Once the shear joint has been formed, additional structures (e.g., a spacer 54 and a leaf spring 56, in the illustrated embodiment) may be connected to the workpieces 10 and 12, as shown in FIGS. 14 and 15. Alternatively, one or more of the additional structures may be connected to one or both of the workpieces 10 and 12 prior to joining the workpieces 10 and 12.

As referenced above, FIG. 16 illustrates an alternative embodiment of a mechanical fastener assembly 14' that may be used to join the two workpieces 10 and 12. The mechanical fastener assembly 14' of FIG. 16 is substantially identical to the embodiment of FIGS. 1-9, except that the rigid plates 46*a* and 46*b* are replaced by washers 50. Other such variations to the mechanical fastener assembly (e.g., using a screw or tube instead of a bolt as the mechanical fastener) may also be employed without departing from the scope of the present disclosure.

It should again be emphasized that the embodiments of mechanical fastener assemblies and workpieces of FIGS. 1-16 are merely exemplary. The illustrated embodiments employ multiple mechanical fastener assemblies, with the shaft of each mechanical fastener assembly passing through multiple sets of adjacent, aligned bores and each mechanical fastener assembly including multiple slotted collars (one for each set of adjacent, aligned bores). In other embodiments, more or fewer mechanical fastener assemblies may be employed, with the shaft of each passing through more or fewer than two sets of adjacent, aligned bores and with each mechanical fastener assembly having more or fewer than two slotted collars. For example, FIGS. 17-21 show a relatively simple embodiment of the present disclosure, in which a shear joint between two workpieces is formed using a mechanical fastener and a single slotted collar.

Figure 19:
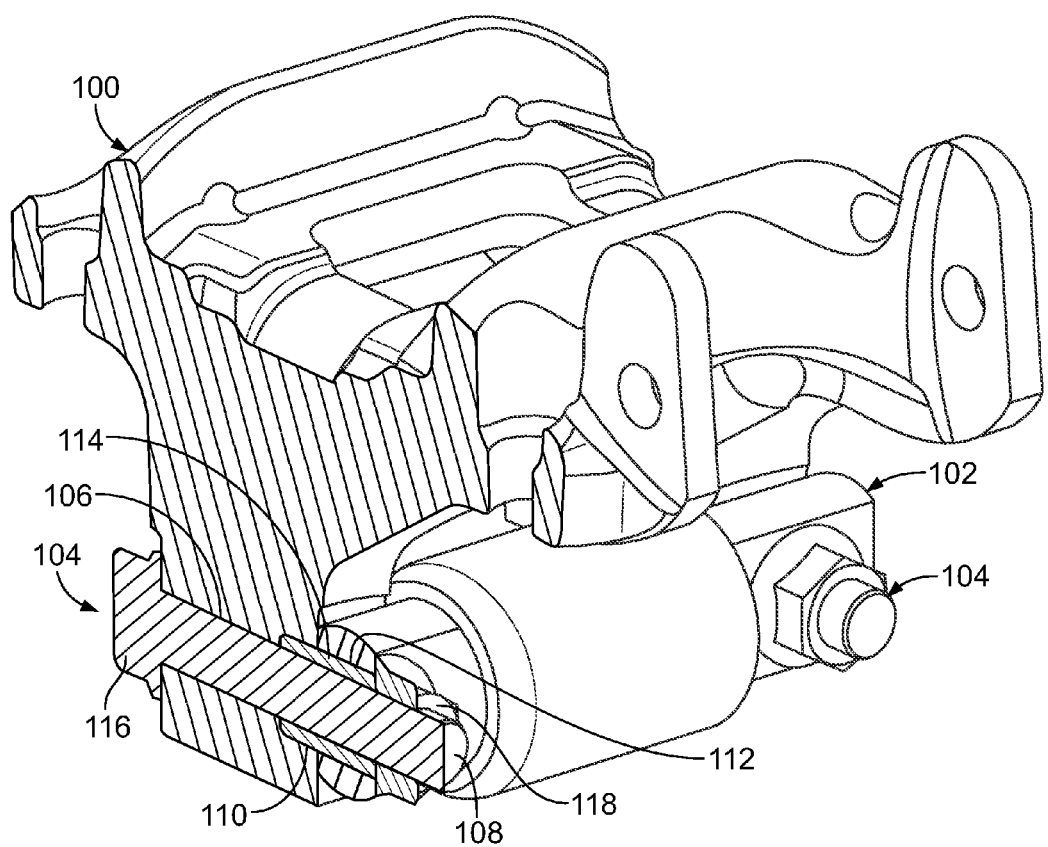
FIGS. 19 and 20 are cross-sectional views of the bottom cap, D-pin bushing, and mechanical fastener assembly of FIG. 17.
Figure 20:
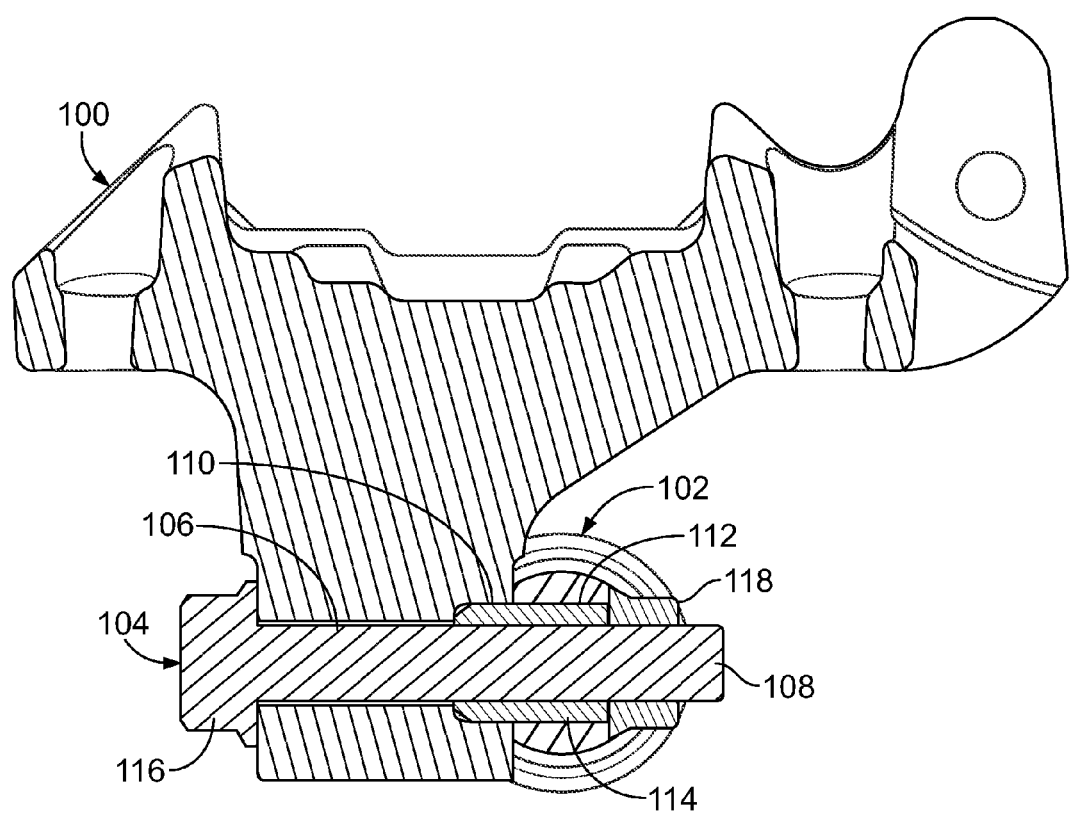
Figure 21:
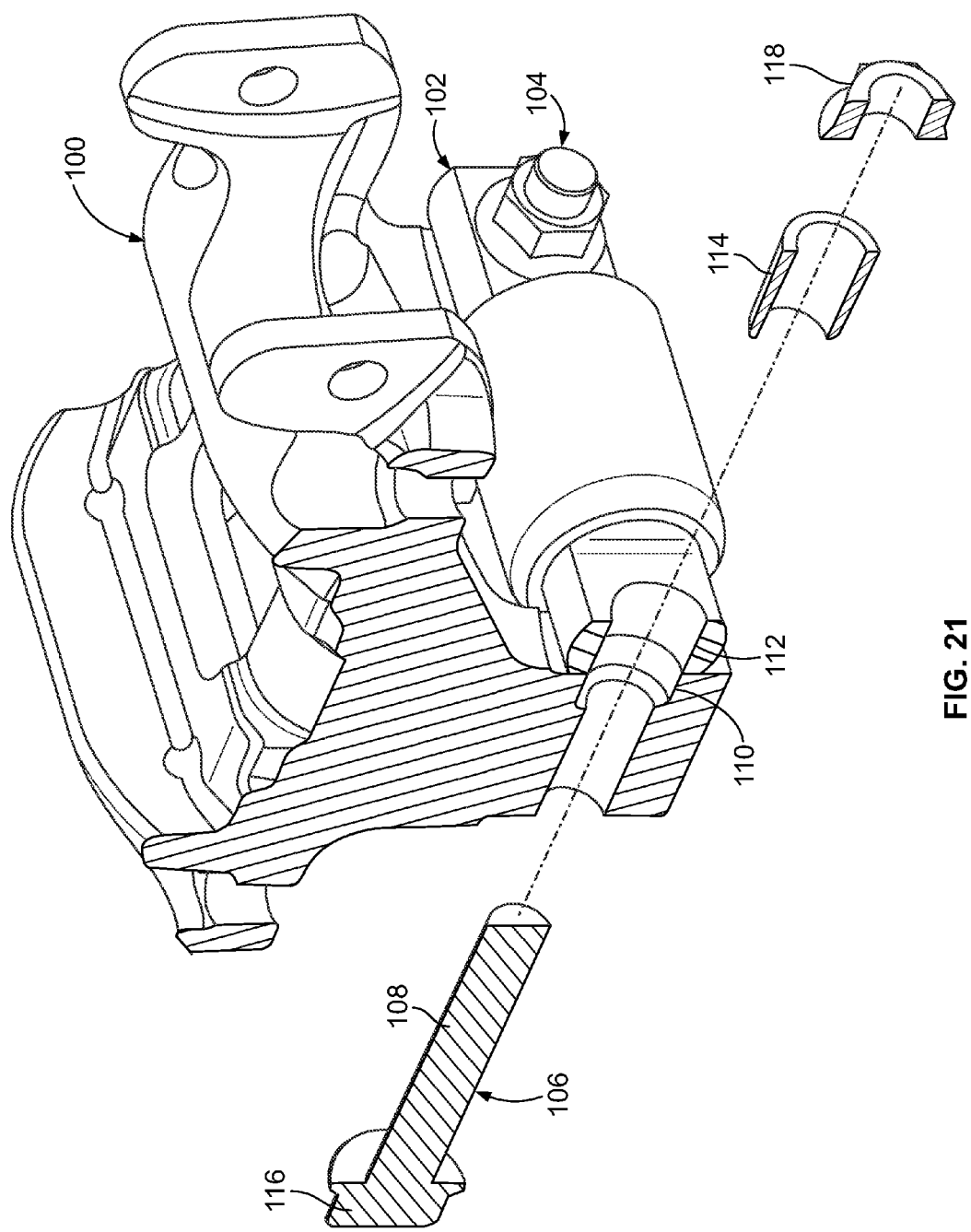
FIG. 21 is a cross-sectional, exploded view of the bottom cap, D-pin bushing, and mechanical fastener assembly of FIG. 17.
Figure 22:
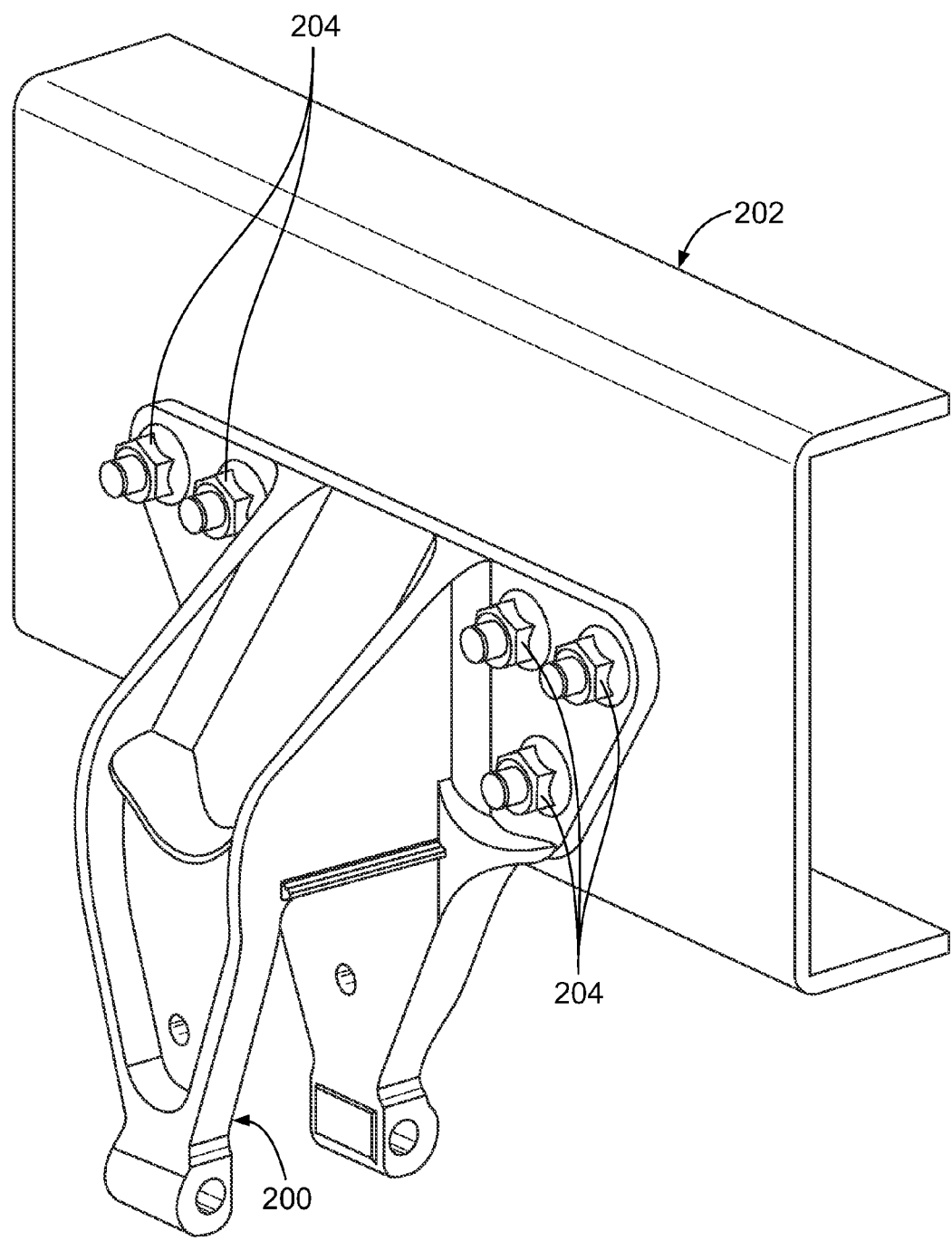
FIG. 22 is a front perspective view of another two different workpieces, shown as a frame hanger of a vehicle suspension system and a vehicle frame, secured together by a mechanical fastener assembly according to an aspect of the present disclosure.
Figure 23:
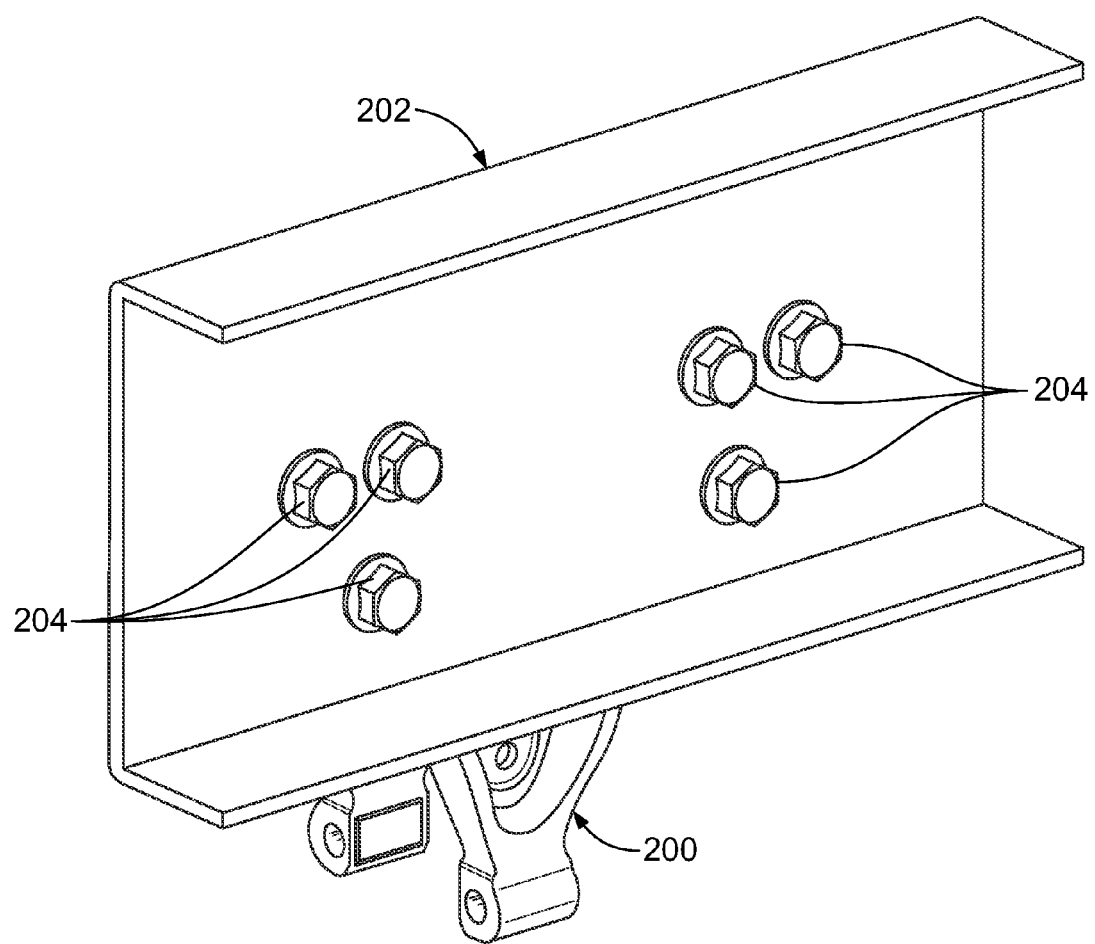
FIG. 23 is a rear perspective view of the frame hanger, vehicle frame, and mechanical fastener assembly of FIG. 22.

In the embodiment of FIGS. 17-21, a first workpiece 100 comprises a bottom cap of a vehicle suspension system and a second workpiece 102 comprises a D-pin bushing secured to the bottom cap 100 at two locations by two substantially identical, separate mechanical fastener assemblies 104. As best seen in FIGS. 19-21, each mechanical fastener assembly 104 comprises a mechanical fastener 106 having a shaft 108 configured to be at least partially received within a single set of adjacent, aligned bores 110 and 112 of the workpieces 100 and 102. The mechanical fastener assembly 104 also includes a slotted collar 114 of the type described in greater detail above, which is also at least partially received within the adjacent, aligned bores 110 and 112 of the workpieces 100 and 102 to form a shear joint between the workpieces 100 and 102. Similar to the mechanical fastener 42 described above, the mechanical fastener 106 of FIGS. 17-21 includes an enlarged head or end piece 116, with a separate second enlarged end piece or nut 118 that may be secured to an opposite end of the shaft 108 by mating threads or the like. In contrast to the embodiments of FIGS. 1-16, it is the second enlarged end piece 118 that bears against the trailing end of the slotted collar 114 to seat it within the aligned bores 110 and 112 of the workpieces 100 and 102 as the second enlarged end piece 118 is advanced onto the shaft 108 of the mechanical fastener 106, but the slotted collar 114 operates otherwise as described above to provide a shear joint connection. The mechanical fastener assembly 106 of FIGS. 17-21 may include additional components (e.g., a rigid plate/washer of the type described above in connection with the embodiments of FIGS. 1-16), but any such additional components are merely optional. Further, it is also within the scope of the present disclosure for the two mechanical fastener assemblies 104 illustrated in FIGS. 17-21 to be differently configured, rather than being identical.

Figure 24:
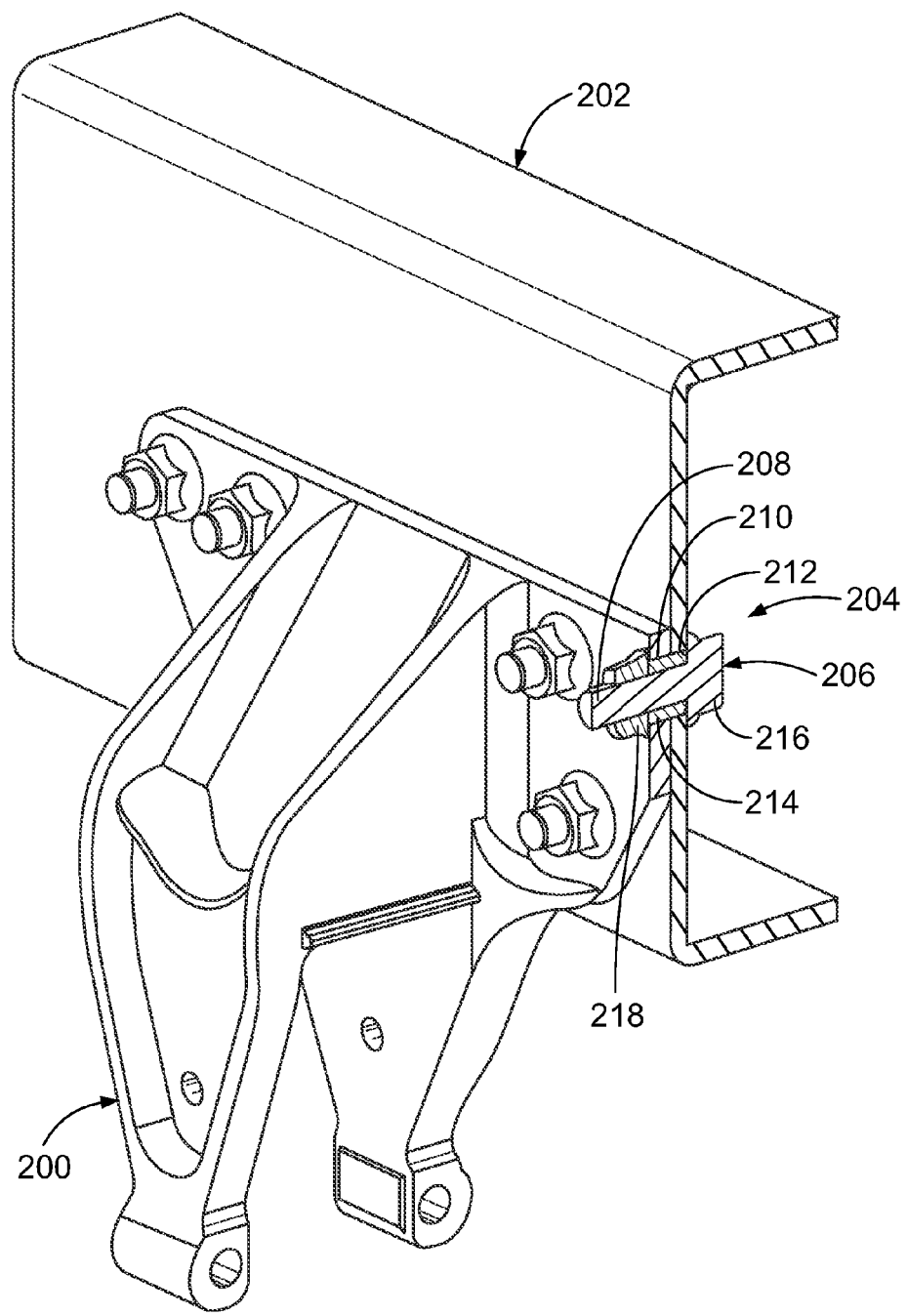
FIGS. 24 and 25 are cross-sectional views of the frame hanger, vehicle frame, and mechanical fastener assembly of FIG. 22.
Figure 25:
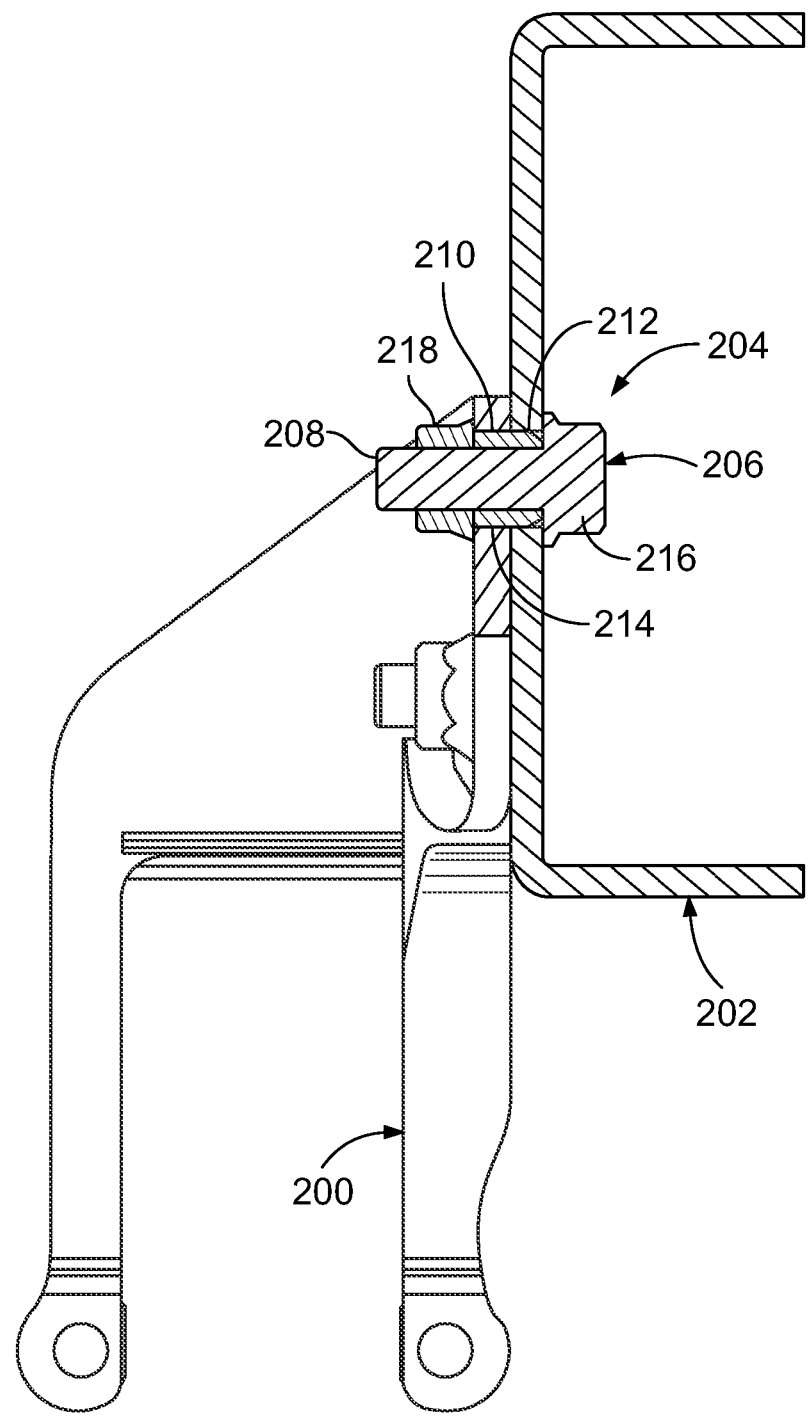
Figure 26:
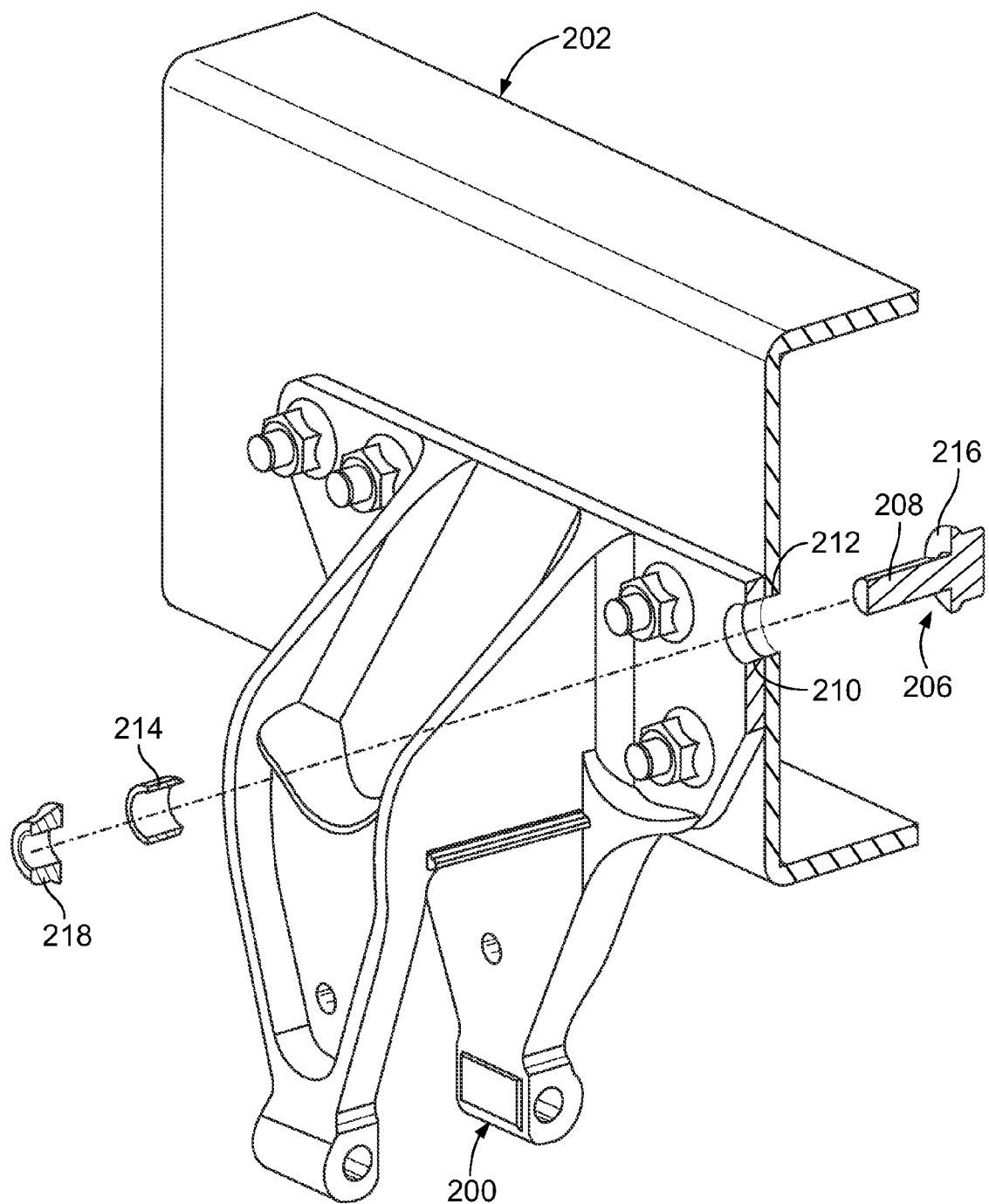
FIG. 26 is a cross-sectional, exploded view of the frame hanger, vehicle frame, and mechanical fastener assembly of FIG. 22.
Figure 27:
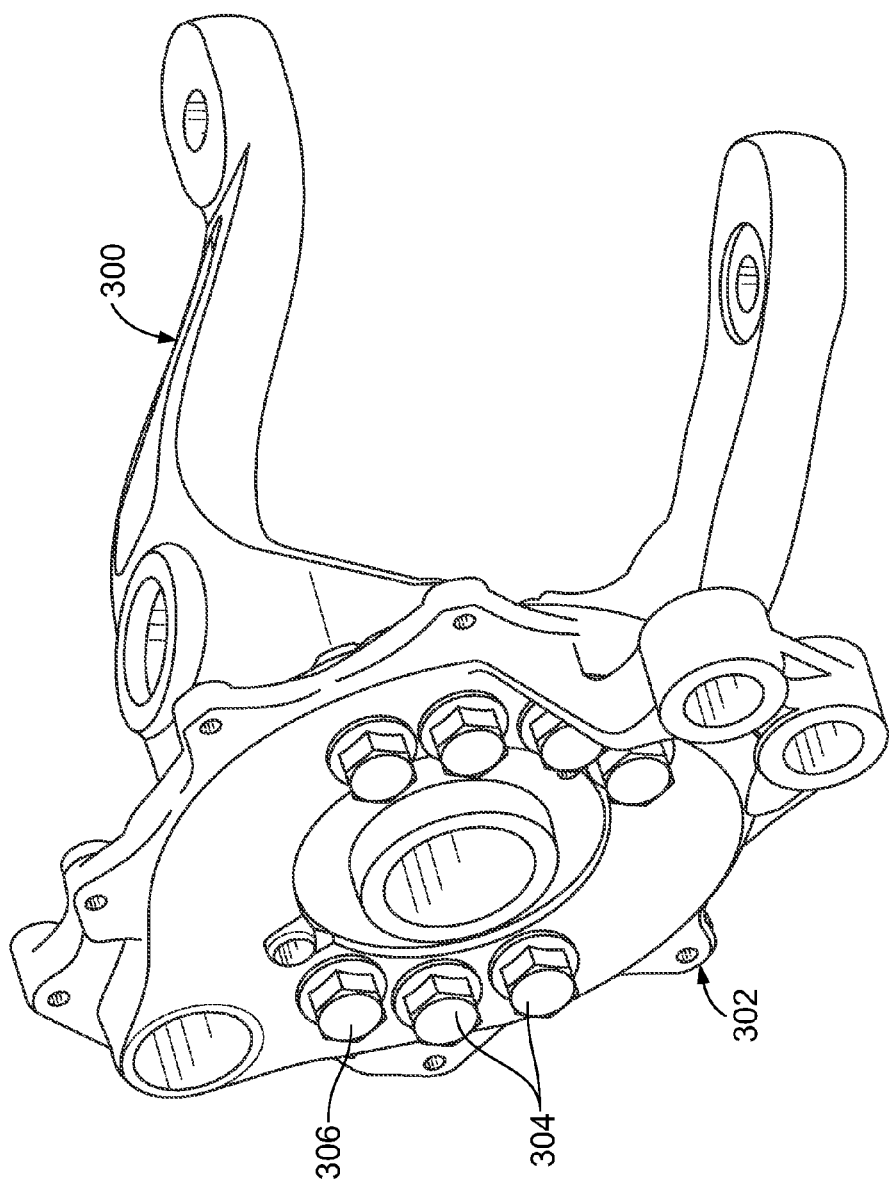
FIG. 27 is a front perspective view of two more different workpieces, shown as a steering knuckle and a brake component of a vehicle steering and braking system, secured together by a mechanical fastener assembly according to an aspect of the present disclosure.
Figure 28:
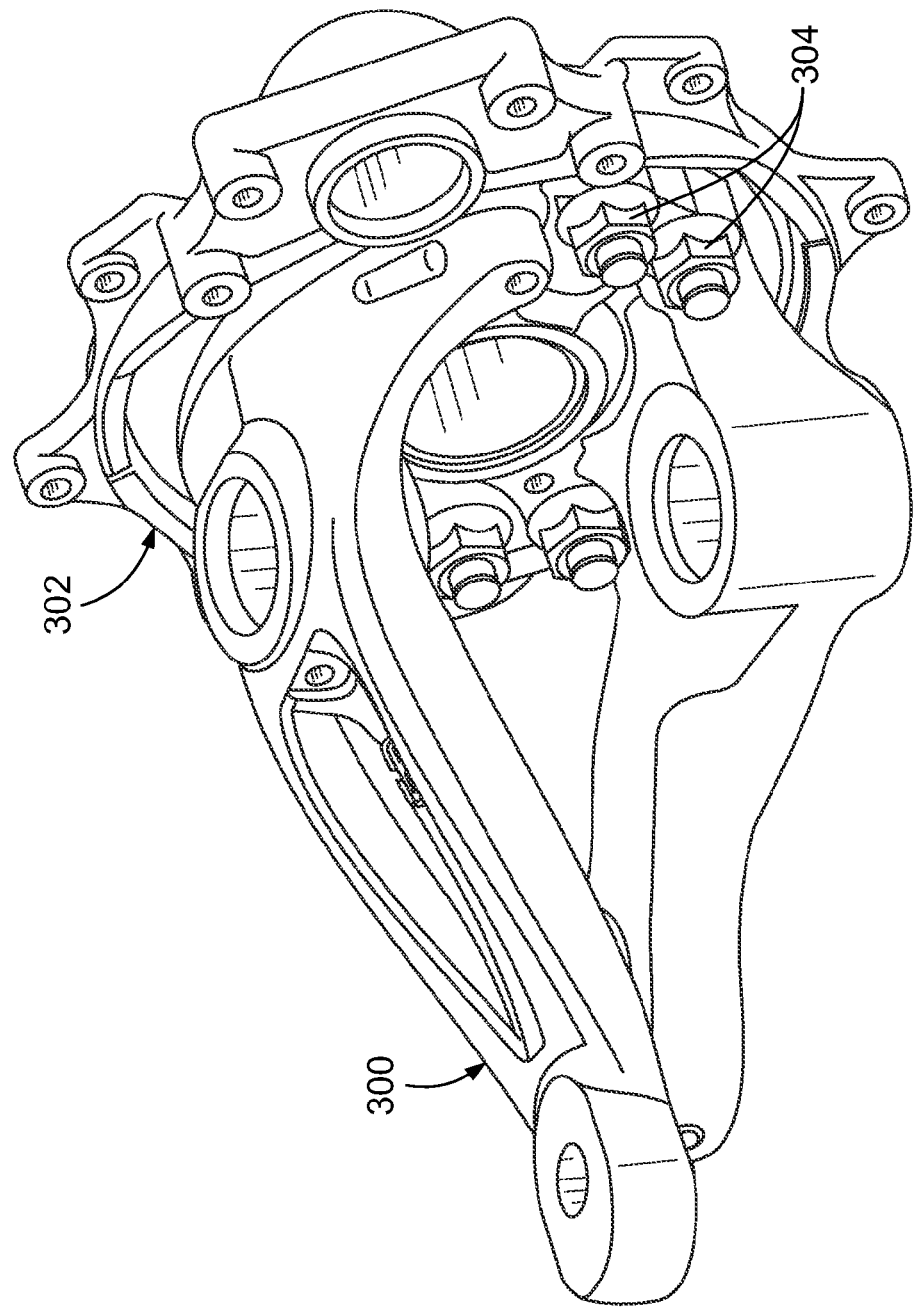
FIG. 28 is a rear perspective view of the steering knuckle, brake component, and mechanical fastener assembly of FIG. 27.

FIGS. 22-26 illustrate another example of two workpieces 200 and 202 connected by one or more mechanical fastener assemblies 204 that provide a shear joint connection. In the embodiment of FIGS. 22-26, the first workpiece 200 comprises a frame hanger of a vehicle suspension system and the second workpiece 202 comprises a vehicle frame to which the frame hanger 200 is secured at multiple locations by a plurality of substantially identical, separate mechanical fastener assemblies 204. As best seen in FIGS. 24-26, each mechanical fastener assembly 204 comprises a mechanical fastener 206 having a shaft 208 configured to be at least partially received within a single set of adjacent, aligned bores 210 and 212 of the workpieces 200 and 202. The mechanical fastener assembly 204 also includes a slotted collar 214 of the type described in greater detail above, which is also at least partially received within the adjacent, aligned bores 210 and 212 of the workpieces 200 and 202 to form a shear joint between the workpieces 200 and 202. Similar to the mechanical fastener 42 described above, the mechanical fastener 206 of FIGS. 22-26 includes an enlarged head or end piece 216, with a separate second enlarged end piece or nut 218 that may be secured to an opposite end of the shaft 208 by mating threads or the like. Similar to the embodiment of FIGS. 17-21, it is the second enlarged end piece 218 that bears against the trailing end of the slotted collar 214 to seat it within the aligned bores 210 and 212 of the workpieces 200 and 212 as the second enlarged end piece 218 is advanced onto the shaft 208 of the mechanical fastener 206 to provide a shear joint connection. The mechanical fastener assembly 204 of FIGS. 22-26 may include additional components (e.g., a rigid plate/washer of the type described above in connection with the embodiments of FIGS. 1-16), but any such additional components are merely optional. Further, it is also within the scope of the present disclosure for the mechanical fastener assemblies 204 illustrated in FIGS. 22-26 to be differently configured, rather than being identical.

Figure 29:
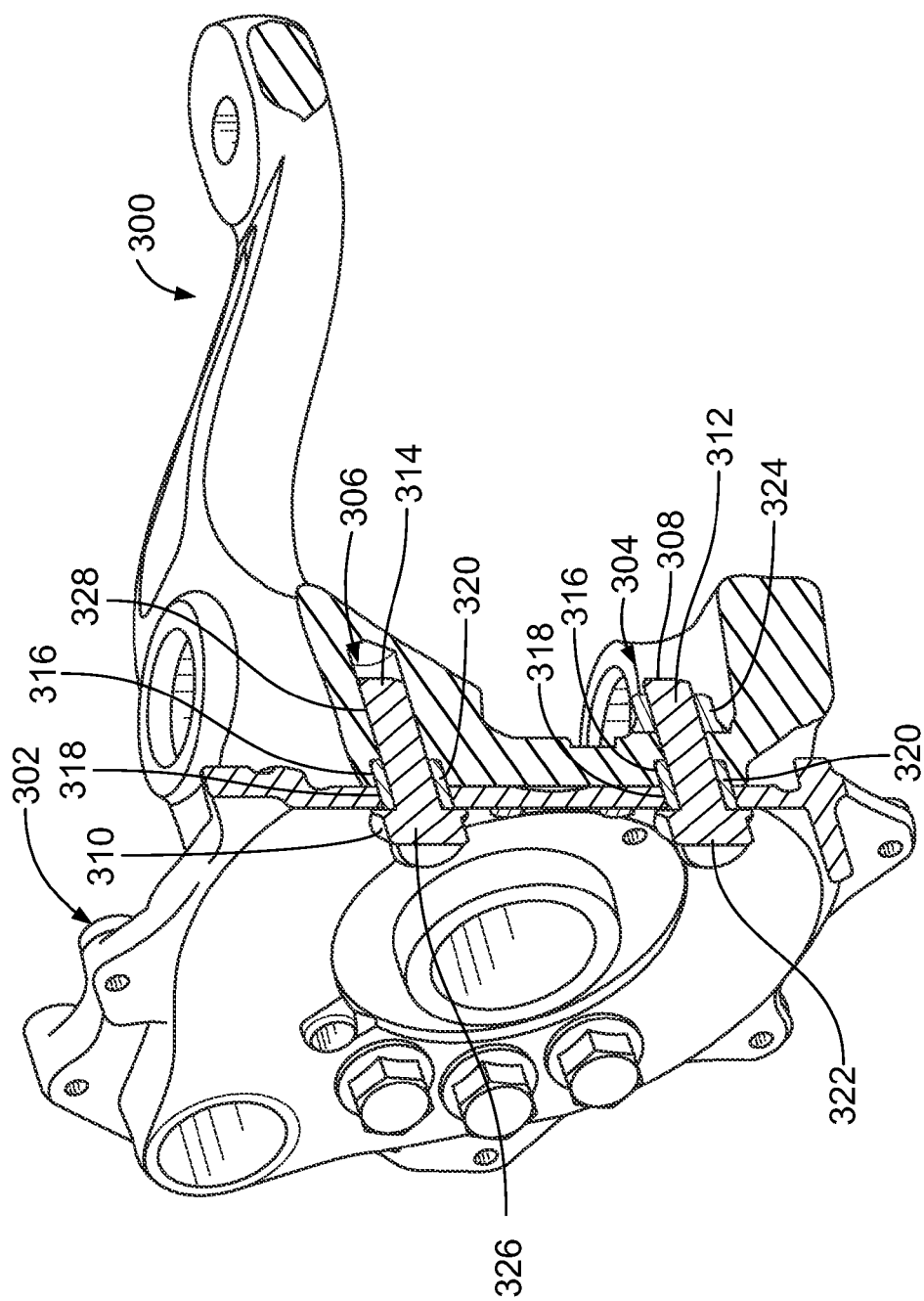
FIGS. 29 and 30 are cross-sectional views of the steering knuckle, brake component, and mechanical fastener assembly of FIG. 27.
Figure 30:
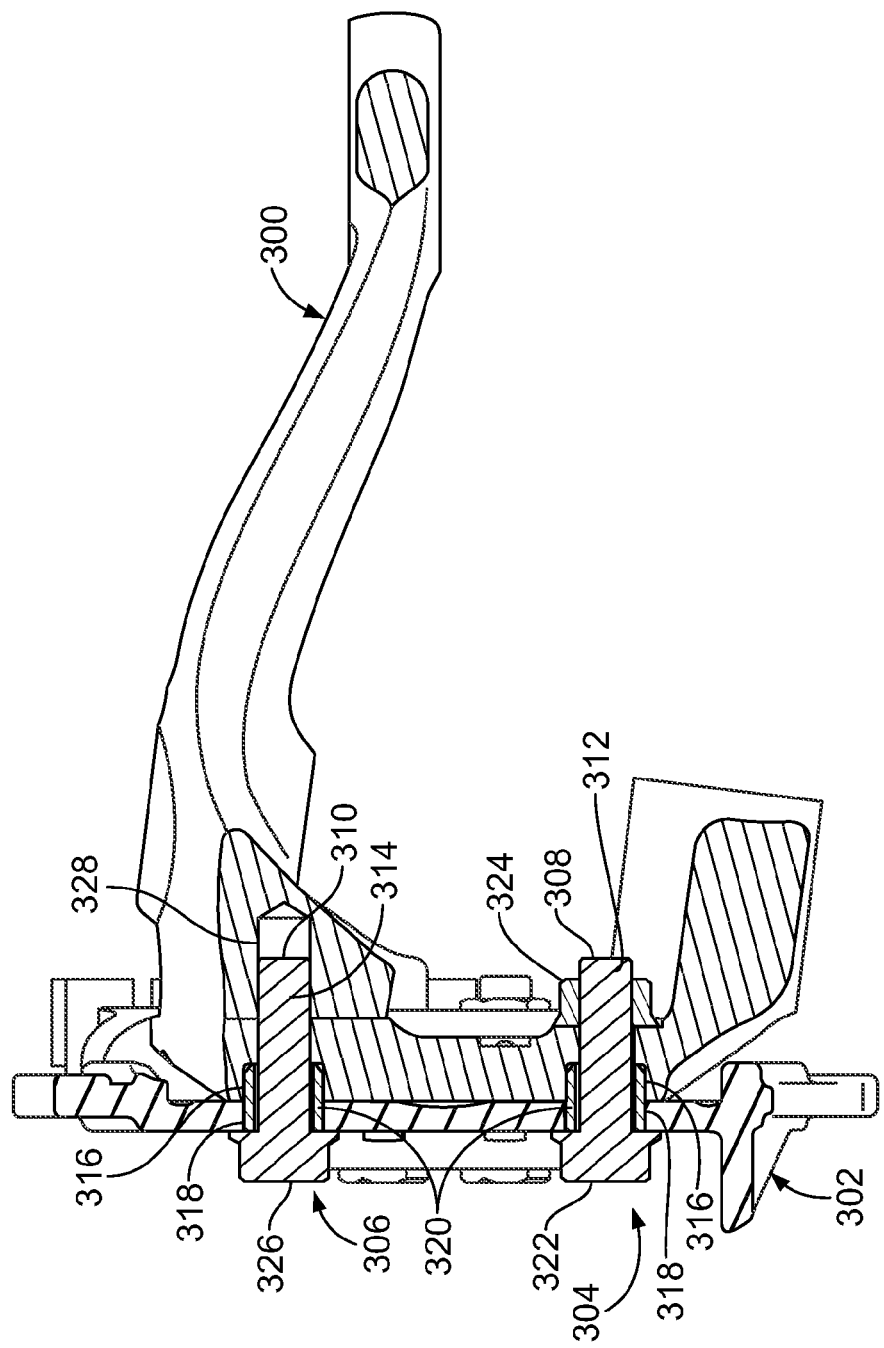
Figure 31:
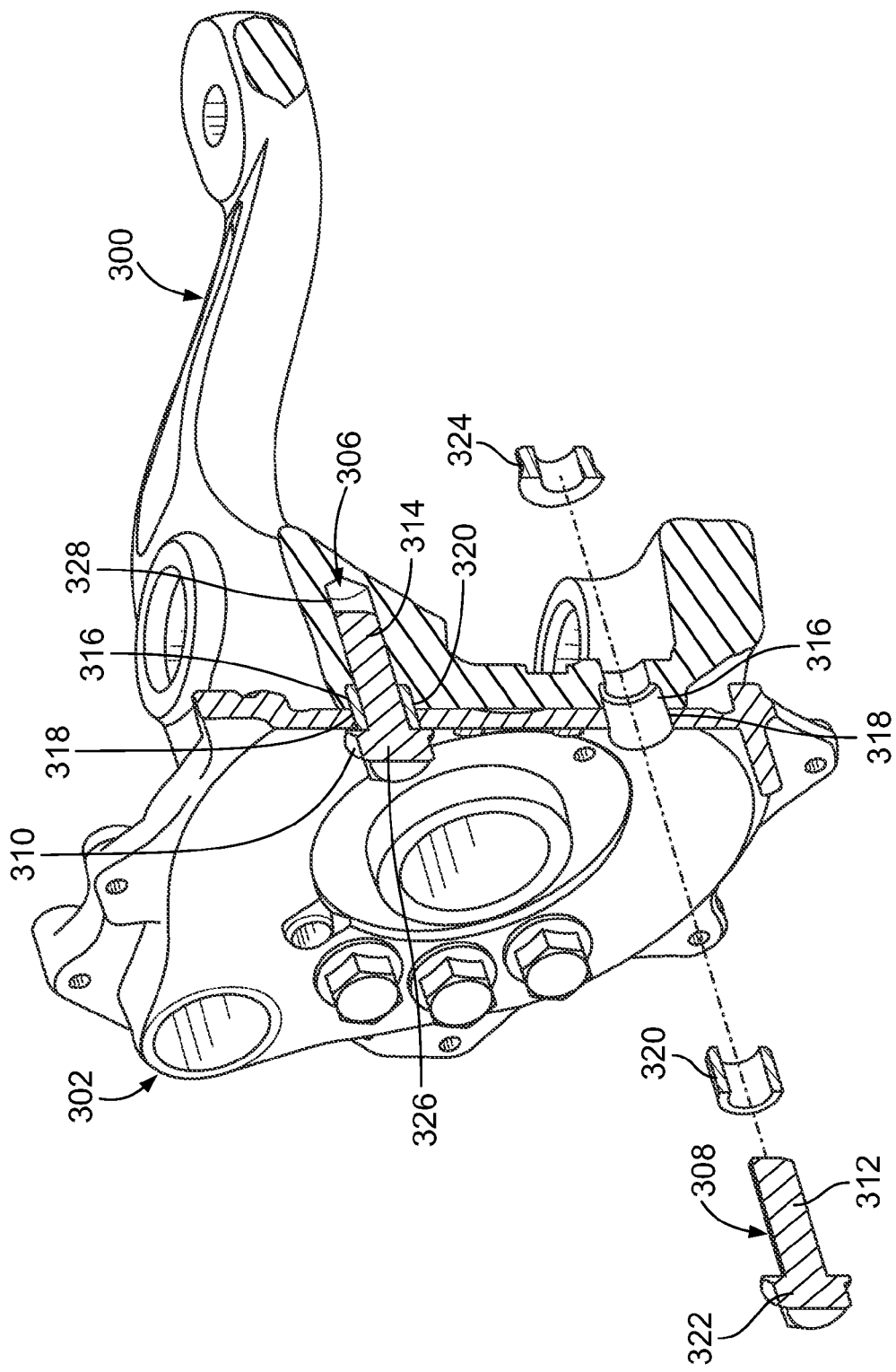
FIG. 31 is a cross-sectional, exploded view of the steering knuckle, brake component, and mechanical fastener assembly of FIG. 27.

FIGS. 27-31 illustrate yet another example of two workpieces 300 and 302 connected by one or more mechanical fastener assemblies that provide a shear joint connection. In the embodiment of FIGS. 27-31, the first workpiece 300 comprises a steering knuckle and the second workpiece 302 comprises a brake component, both of a vehicle steering and braking system, which are secured together at multiple locations by a plurality of separate, differently configured mechanical fastener assemblies 304 and 306. As best seen in FIGS. 29-31, each mechanical fastener assembly 304, 306 comprises a mechanical fastener 308, 310 having a shaft 312, 314 configured to be at least partially received within a single set of adjacent, aligned bores 316 and 318 of the workpieces 300 and 302. Each mechanical fastener assembly 304, 306 also includes a slotted collar 320 of the type described in greater detail above, which is also at least partially received within the adjacent, aligned bores 316 and 318 of the workpieces 300 and 302 to form a shear joint between the workpieces 300 and 302. Similar to the mechanical fastener 42 described above, the lower mechanical fastener 308 of FIGS. 27-31 includes an enlarged head or end piece 322, with a separate second enlarged end piece or nut 324 that may be secured to an opposite end of the shaft 312 by mating threads or the like. As in the embodiments of FIGS. 1-16, the first enlarged end piece 322 bears against the trailing end of the slotted collar 322 to seat it within the aligned bores 316 and 318 of the workpieces 300 and 302 as the second enlarged end piece 324 is advanced onto the shaft 312 of the mechanical fastener 308 to provide a shear joint connection.

As for the upper mechanical fastener assembly 306, its mechanical fastener 310 includes a first enlarged end piece 326 integrally formed with the shaft 314 and configured to contact the trailing end of the slotted collar 320 to seat it within the aligned bores 316 and 318, but there is no second enlarged end piece provided. Instead, at least a portion of the bore of one or both of the workpieces (illustrated as a portion 328 of the bore 316 of the first workpiece 300) is configured to engage and retain the shaft 314 as the shaft 314 is advanced into the aligned bores 316 and 318. In a preferred embodiment, the outer surface of the shaft 314 includes threads that are mated with threads defined in one or both of the bores 316 and 318 of the workpieces 300 and 302 to retain the shaft 314 as it is rotatably advanced into the bores 316 and 318 to seat the slotted collar 320 and provide a shear joint connection. If the second enlarged end piece 324 of the lower mechanical fastener assembly 304 is configured to be secured to the associated shaft 312 by mating threads, the mechanical fasteners 308 and 310 of the lower and upper mechanical fastener assemblies 304 and 306 may be identical; otherwise, it is also within the scope of the present disclosure for the mechanical fasteners 308 and 310 to be differently configured. Other means of securing the shaft 314 of the upper mechanical fastener assembly 306 within the bores 316 and 318 may also be provided without departing from the scope of the present disclosure. The mechanical fastener assemblies 304 and 306 of FIGS. 27-31 may include additional components (e.g., a rigid plate/washer of the type described above in connection with the embodiments of FIGS. 1-16), but any such additional components are merely optional.

Figure 32:
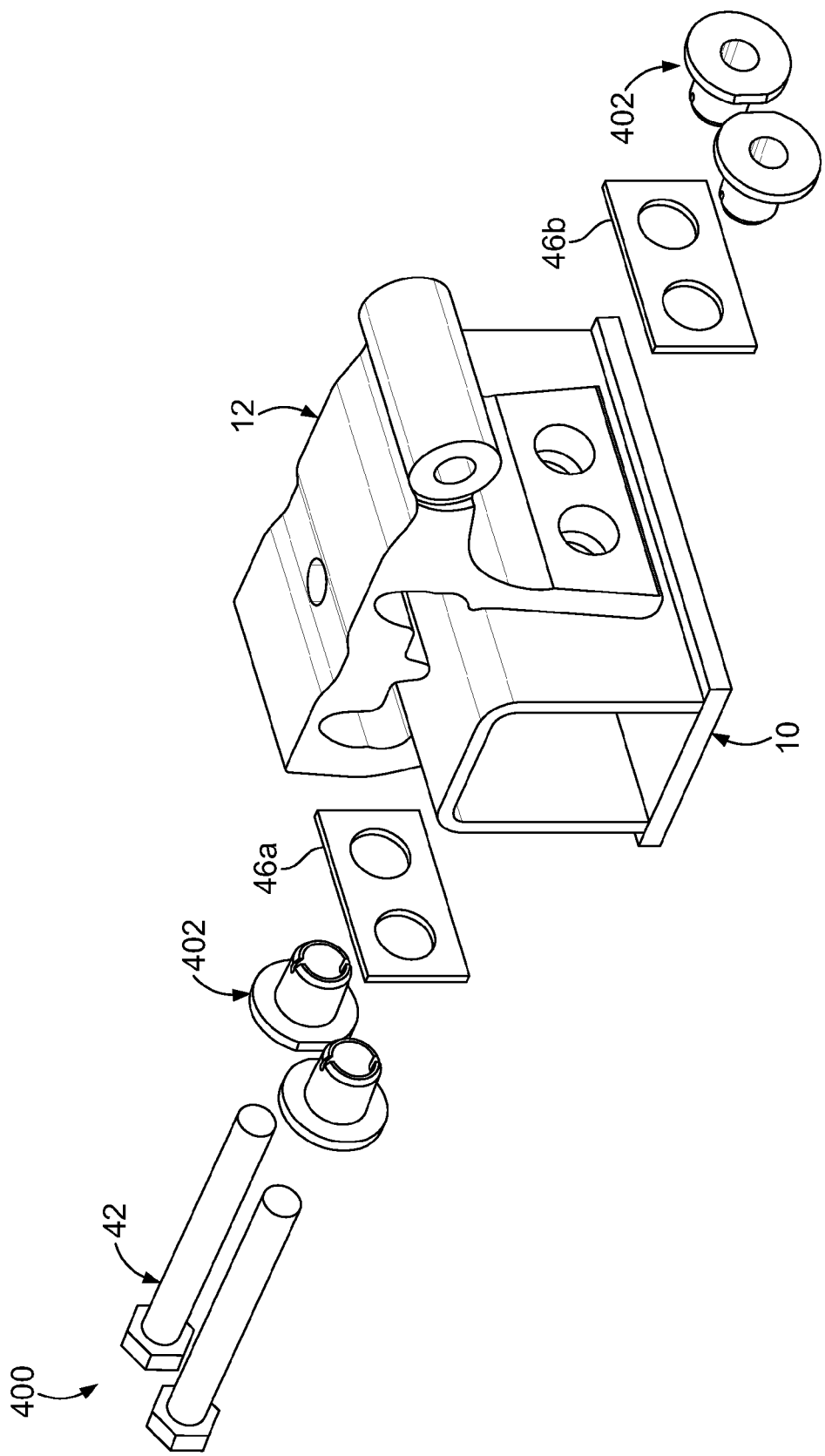
FIG. 32. is an exploded view of the vehicle axle and suspension system component of FIG. 1, shown with an alternative embodiment of a mechanical fastener assembly according to the present disclosure.
Figure 33:
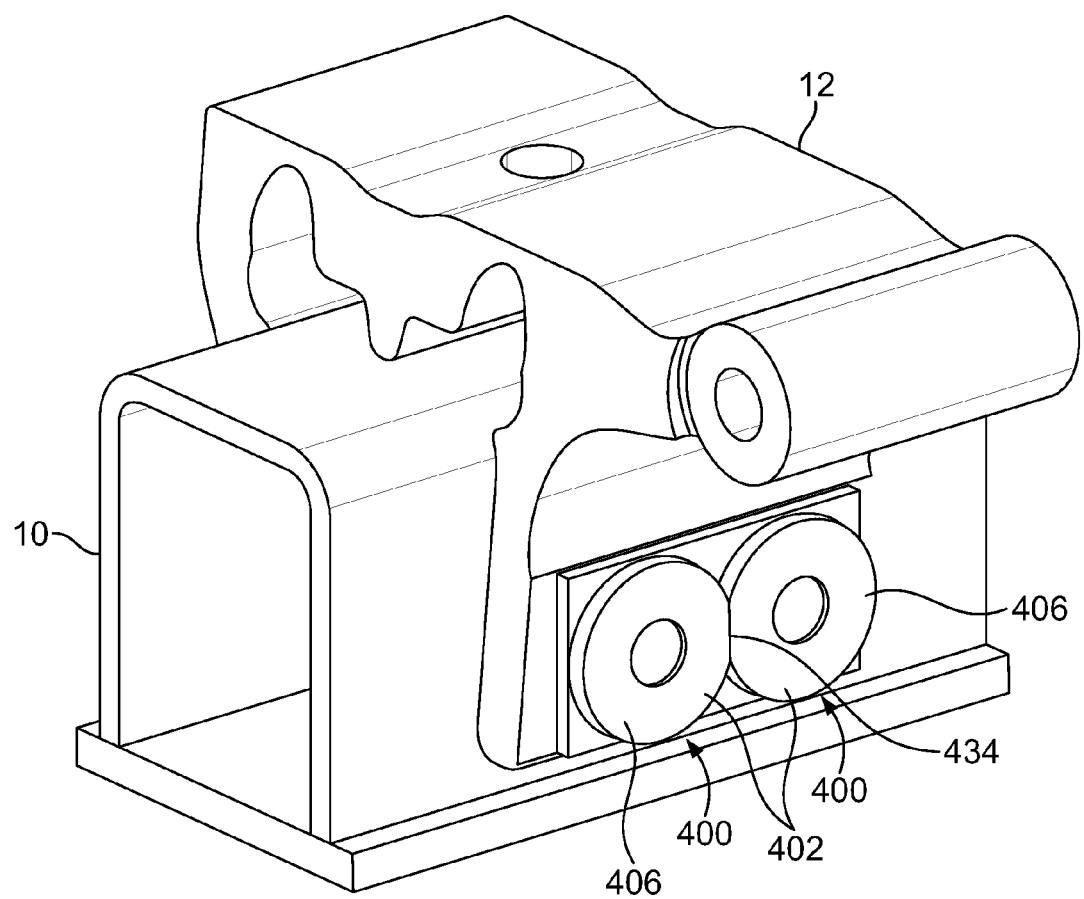
FIG. 33 is a front perspective view of the vehicle axle, suspension system component, and mechanical fastener assembly of FIG. 32.

FIGS. 32-34 illustrate a pair of substantially identical mechanical fastener assemblies 400 having a differently configured slotted component. More particularly, each illustrated mechanical fastener assembly 400 includes two slotted inserts or plugs 402, although it should be understood that a single slotted insert may be used instead of two slotted inserts. It is also within the scope of the present disclosure for a mechanical fastener assembly to include both a slotted insert and a slotted collar of the type described above.

The slotted inserts 402 perform a function similar to the function performed by the slotted collars described above, but have a different configuration. The slotted inserts 402 of FIGS. 32-34 include a body portion 404 and a head portion 406 (FIGS. 35 and 36). Preferably, the slotted inserts 402 are integrally formed components, with the body portion 404 and head portion 406 provided as sections of a single-piece component, but it is also within the scope of the present disclosure for the body portion 404 and the head portion 406 to be separately provided and then secured together.

The illustrated body portion 404 is shaped similarly to the slotted collars described above, being sized to be at least partially received within the aligned bores of first and second workpieces, such as the axle 10 and suspension system component 12 of FIG. 1. As shown in greater detail in FIGS. 35 and 36, the body portions 404 of the slotted inserts 402 may be generally tubular or annular, with at least one slot 408 defined in the wall of the body portion 404. As best shown in FIG. 36, the body portion 404 may include a plurality of slots, such as a pair of slots 408 diametrically opposed to each other, which may be substantially identical to each other (as illustrated) or differently configured.

The illustrated slots 408 are substantially parallel to a central axis of the slotted insert 402, but it is also within the scope of the present disclosure for the slots to be oriented at an angle with respect to the central axis of the associated slotted insert. As best shown in FIG. 36, the illustrated slots 408 begin at a free or lead-in end 410 of the body portion 404 (i.e., the end of the body portion 404 that is spaced away from the head portion 406) and extend along only a portion of the length of the body portion 404, rather than extending along the entire length of the body portion 404 or the slotted insert 402. The slotted section of the body portion 404 will typically be more flexible (i.e., more capable of being moved toward and away from the central axis of the slotted insert 402) than the section of the body portion 404 that does not include the slots 408. Thus, the flexibility profile of the body portion 404 may be varied by varying the length of the slots 408. The flexibility of the slotted section may be varied by varying any of a number of factors, such as the number of slots, the location of the slots, and the angular extent or width of the slots. Other slot configurations (e.g., slots having a varying or non-uniform width, rather than a substantially uniform width) may also be employed without departing from the scope of the present disclosure.

Figure 38:
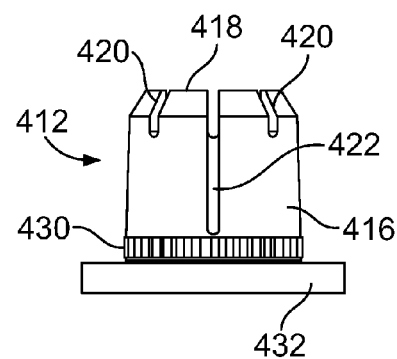
FIG. 38 is a front elevational view of the slotted insert of FIG. 35.
Figure 39:
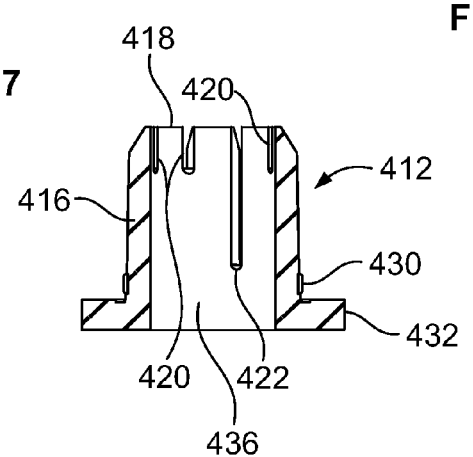
FIG. 39 is a cross-sectional view of the slotted insert of FIG. 35, taken through the line 39-39 of FIG. 37.
Figure 40:
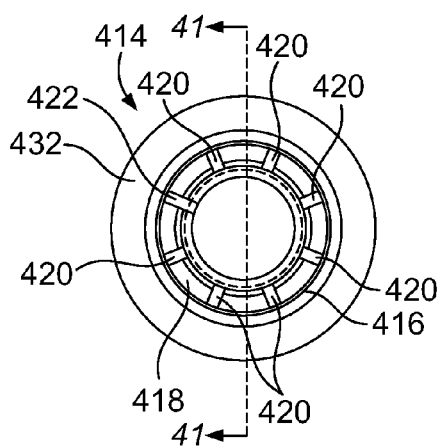
FIG. 40 is a top plan view of an alternative embodiment of a second slotted insert.
Figure 41:
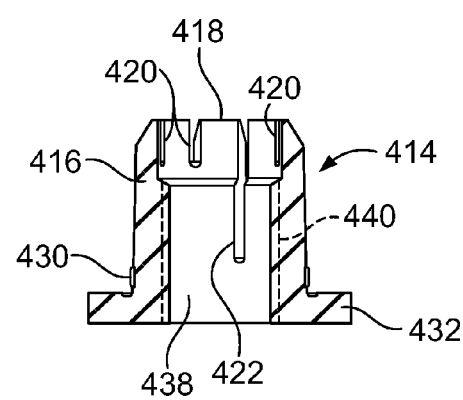
FIG. 41 is a cross-sectional view of the slotted insert of FIG. 40, taken through the line 41-41 of FIG. 40.

FIGS. 37-41 illustrate two examples of slotted inserts 412 and 414 having differently configured slots. In the illustrated embodiments, eight slots are evenly spaced around the perimeter of the body portion 416 of the slotted inserts 412 and 414, with each slot beginning at the lead-in end 418 of the body portion 416. Seven of the slots 420 ("minor slots") are substantially identical, while the eighth slot 422 ("major slot") is differently configured. In the illustrated embodiments, the seven minor slots 420 extend along a minor portion of the length of the body portion 416 (e.g., only approximately 25% of the length of the body portion 416), while the major slot 422 has a length approximately three times greater than the length of the other slots 420 and extends along the majority of the length of the body portion 416 (e.g., approximately 75% of the length of the body portion 416), as best shown in FIGS. 38-39 and 41. Compared to the slotted inserts 402 of FIGS. 35 and 36, the slotted inserts 412 and 414 of FIGS. 37-41 tend to have a more flexible body portion due to the increased number of slots and the addition of the major slot 422, which may be advantageous for creating a shear joint to join two workpieces together.

Figure 34A:
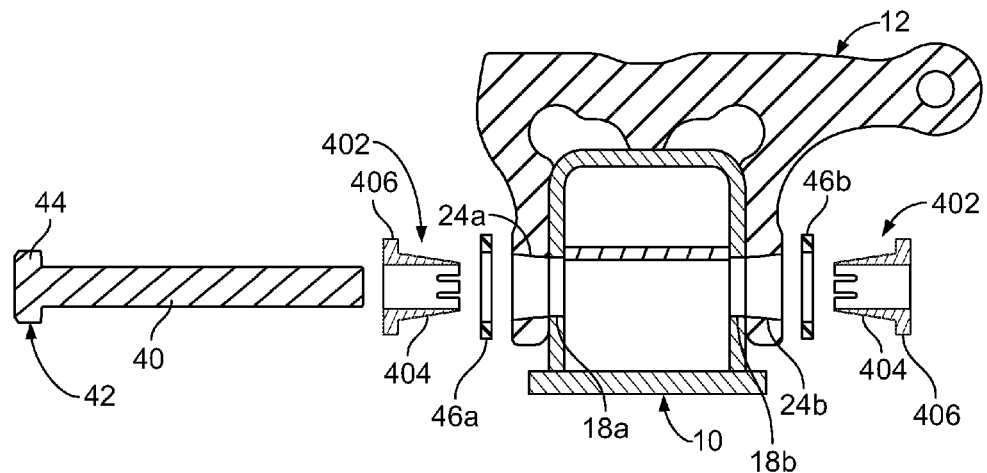
FIG. 34A is a cross-sectional, exploded view of another embodiment of a vehicle axle, suspension system component, and mechanical fastener assembly according to the present disclosure.
Figure 34B:
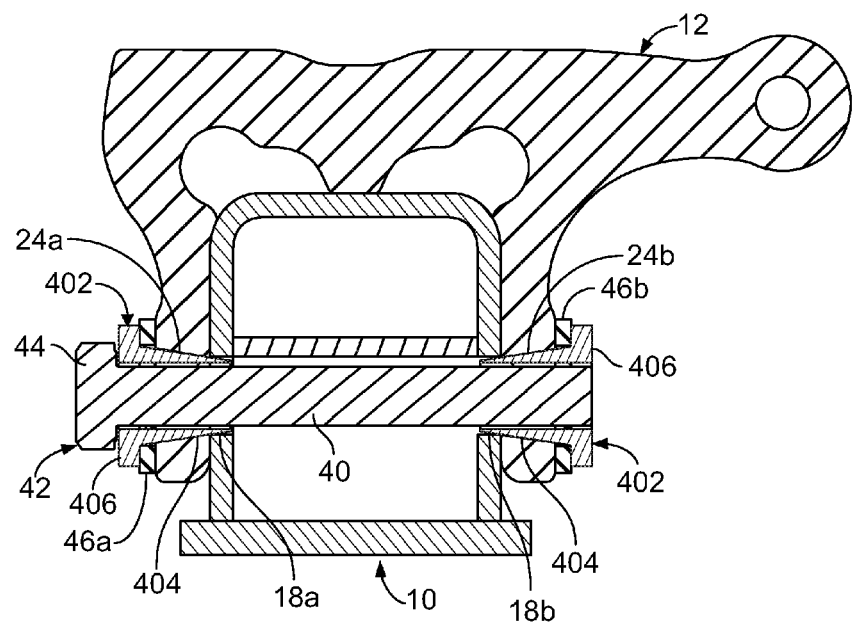
FIG. 34B is a cross-sectional view of the vehicle axle, suspension system component, and mechanical fastener assembly of FIG. 34A, in an assembled condition.
Figure 37:
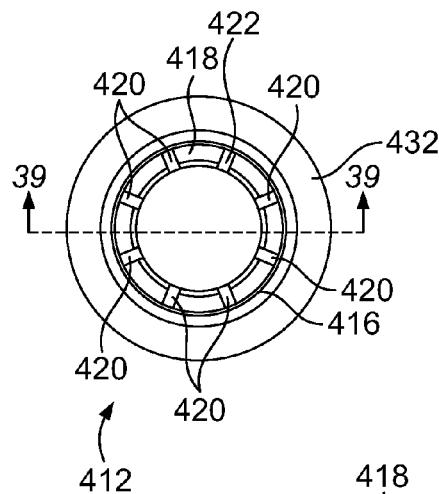
FIG. 37 is a top plan view of an alternative embodiment of a first slotted insert.

Similar to the above-described slotted collars, the inner surface 424 of the body portion 404 (FIG. 36) may have a substantially uniform diameter, while the outer surface 426 may have a non-uniform diameter. For example, the outer surface 426 of the body portion 404 may be tapered to define a generally frusto-conical surface with a greater diameter at one end than at the other end. If the body portion 404 is so configured, it may be preferable for the lead-in end 410 to have a smaller outer diameter than the opposite end of the body portion 404 (i.e., the end directly adjacent to the head portion 406). As in the above-described slotted collars, the lead-in end 410 of the body portion 404 of the slotted insert 402 may include a chamfer 428, which may be employed in combination with or separately from the above-described taper. FIGS. 34A and 34B show a body portion 404 with an exaggerated taper to better illustrate a slotted insert 402 with a body portion 404 having a tapered outer surface. FIGS. 34A and 34B illustrate the combination of a body portion with a tapered outer surface and workpieces with aligned bores in which at least a portion of the associated aligned bores is also tapered, as described above.

In addition or instead of having a taper and/or a chamfer, the outer surface of the body portion of a slotted insert may include other features or formations. For example, the outer surface of the body portions 416 of the slotted inserts 412 and 414 shown in FIGS. 37-41 are provided with a textured or knurled section 430. In the illustrated embodiments, the knurled section 430 defines a continuous ring around the head portion 416 of the slotted insert 412, 414 adjacent to the head portion 432, but other configurations and orientations may also be employed without departing from the scope of the present disclosure. While this feature is not illustrated in the drawings of the other slotted collars and inserts described herein, it should be understood that they may also include one or more textured or knurled sections or surfaces, which may provide any of a number of advantages and functions, such as modifying the flexibility of the slotted collar/insert and/or providing an improved fit with one or more of the bores of the associated workpieces.

As for the head portion 406 of the slotted insert 402, it has a larger diameter than the associated body portion 404. The head portion 406 is intended to be positioned outside of the aligned bores of the first and second workpieces 10 and 12 during use, so it may be advantageous for it to have a larger diameter than the bores. In the embodiment of FIGS. 32-36, the head portion 406 is generally annular, without being circular. Instead, the perimeter of the head portion 406 includes a flat section 434 that provides an anti-rotation feature, as will be described in greater detail below. In other embodiments, the head portion may have a substantially circular shape (see FIG. 37-41) or a different non-circular shape (e.g., a shape configured to be engaged by a wrench or another tool, such as a hexagonal shape).

In addition to the slotted inserts 402, the mechanical fastener assemblies 400 illustrated in FIGS. 32-34 may each include a mechanical fastener 42 and pair of rigid plates 46a, 46b of the type shown in FIGS. 1-9, although it is also within the scope of the present disclosure for a slotted insert to be used in a differently configured mechanical fastener assembly. It will be seen that the mechanical fastener assembly 400 of FIGS. 32-34 omits a nut secured to the threaded portion of the mechanical fastener 42, as the nut is effectively replaced by one of the slotted inserts 402, as will be described in greater detail herein.

To assemble the mechanical fastener assembly 400 (thereby securing the first and second workpieces 10 and 12 together), the bores 18a, 18b and 24a, 24b of the first and second workpieces 10 and 12 are aligned (FIG. 34). The rigid plates 46a and 46b are placed against the workpieces 10 and 12, with the bores 48 of the plates 46a and 46b in alignment with the bores 18a, 18b and 24a, 24b of the workpieces 10 and 12. The body portions 404 of the slotted inserts 402 are then pressed through the bores 48 of the plates 46a and 46b, and into the bores 18a, 18b and 24a, 24b of the workpieces 10 and 12. If two mechanical fastener assemblies 400 are to be used to secure the workpieces 10 and 12, it may be advantageous for the head portions 406 of the slotted inserts 402 to be configured such that the flat sections 434 of the head portions 406 of two adjacent slotted inserts 402 are substantially flush with each other, as best shown in FIG. 33. By such a configuration, the head portions 406 cooperate to prevent each other from rotating within the aligned bores.

With the slotted inserts 402 in place, the shaft 40 of the mechanical fastener 42 may be at least partially inserted into the aligned bores, passing through the central bores or openings of the slotted inserts 402, such that at least a portion of the shaft 40 is surrounded by or received within the slotted inserts 402 (FIG. 34). The shaft 40 has a smaller diameter than the bores 18a, 18b and 24a, 24b of the workpieces 10 and 12, such that there is a gap between the outer surface of the shaft 40 and the aligned bores, with the slotted inserts 402 occupying at least a portion of that gap.

With the shaft 40 of the mechanical fastener 42 at least partially inserted into the aligned bores, the slotted inserts 402 may be further advanced into the associated set of aligned bores. Preferably, at least a portion of the outer surface of the body portion 404 of the slotted inserts 402 has a greater diameter than the associated set of aligned bores, such that fully pressing each slotted insert into its associated set of aligned bores causes the slot or slots of the slotted insert to at least partially close, thereby decreasing the outer and inner diameters of the slotted section of the body portion 404. Preferably, the slotted inserts 402 are configured such that the workpiece bores press the body portions 404 into contact with the shaft 40 of the mechanical fastener 42, thereby placing at least a portion of the inner surfaces 424 of the body portions 404 into contact or engagement with the shaft 40 of the mechanical fastener 42 and placing at least a portion of the outer surface 426 of the body portions 404 into contact or engagement with the associated aligned bores. By contacting both the shaft 40 of the mechanical fastener 42 and the aligned bores, the body portions 404 of the slotted inserts 402 create shear joints to secure the workpieces 10 and 12 together, effectively transforming a bolted joint into a riveted joint.

Preferably, the slotted inserts 402 are configured to elastically deform to the final configuration of FIG. 34, rather than inelastically or permanently deforming. By such a configuration, the mechanical fastener assembly 400 may be used to create a shear joint (as described above), while still being fully removable from the workpieces 10 and 12 for servicing. In one embodiment, the slotted inserts 402 may be formed of a metal material, such as steel, but other materials may also be used without departing from the scope of the present disclosure.

If the mechanical fastener 42 is provided as a bolt having an enlarged head or end piece 44 and a threaded section spaced from the enlarged head 44, the slotted inserts may be advanced into the bores 18a, 18b and 24a, 24b by mating engagement between one of the slotted inserts and the threaded section of the mechanical fastener shaft 40. For example, FIGS. 37-41 illustrate two slotted inserts 412 and 414 having differently configured inner surfaces. The slotted insert 412 of FIGS. 37-39 (which may be referred to as the "first insert" or the "proximal insert") has a relative smooth and/or featureless inner surface 436, whereas the inner surface 438 of the slotted insert 414 of FIGS. 40 and 41 (which may be referred to as the "second insert" or the "distal insert") includes a threaded section 440, with the threads of the second insert 414 being configured to mate with the threads of the threaded section of the associated mechanical fastener of the mechanical fastener assembly. The illustrated threaded section 440 is present in both the body portion 416 and head portion 432 of the distal insert 414, but it is also within the scope of the present disclosure for the threaded section to be present in only the body portion 416 or only the head portion 432.

To install a mechanical fastener assembly having slotted inserts 412 and 414 as illustrated in FIGS. 37-41, the body portions 416 of the first and second slotted inserts 412 and 414 may be at least partially inserted aligned bores of first and second workpieces. The mechanical fastener may then be inserted into the bores, with the enlarged head of the mechanical fastener positioned adjacent to the proximal insert 412 and the threaded section of the mechanical fastener positioned adjacent to the distal insert 414. When the mechanical fastener has been inserted sufficiently so as to place the threaded sections into contact with each other, the mechanical fastener and/or the distal insert 414 may be rotated to cause the threads of the threaded sections to mate with each other, which effectively advances the mechanical fastener and the slotted inserts 412 and 414 further into the aligned bores of the workpieces. Preferably, the slotted inserts 412 and 414 are advanced into the aligned bores until their head portions 432 contact one of the workpieces (or any other physical obstacle, such as a plate of the mechanical fastener assembly, if provided). It should be understood that this is only one manner of securing the mechanical fastener and slotted insert(s) of a mechanical fastener assembly, and other means may be provided for maintaining the components of the mechanical fastener assembly in place, including a threaded bolt, as described above. Additionally, it should be understood that the first and second inserts 412 and 414 may be used either in combination with each other or separately.

Figure 42:
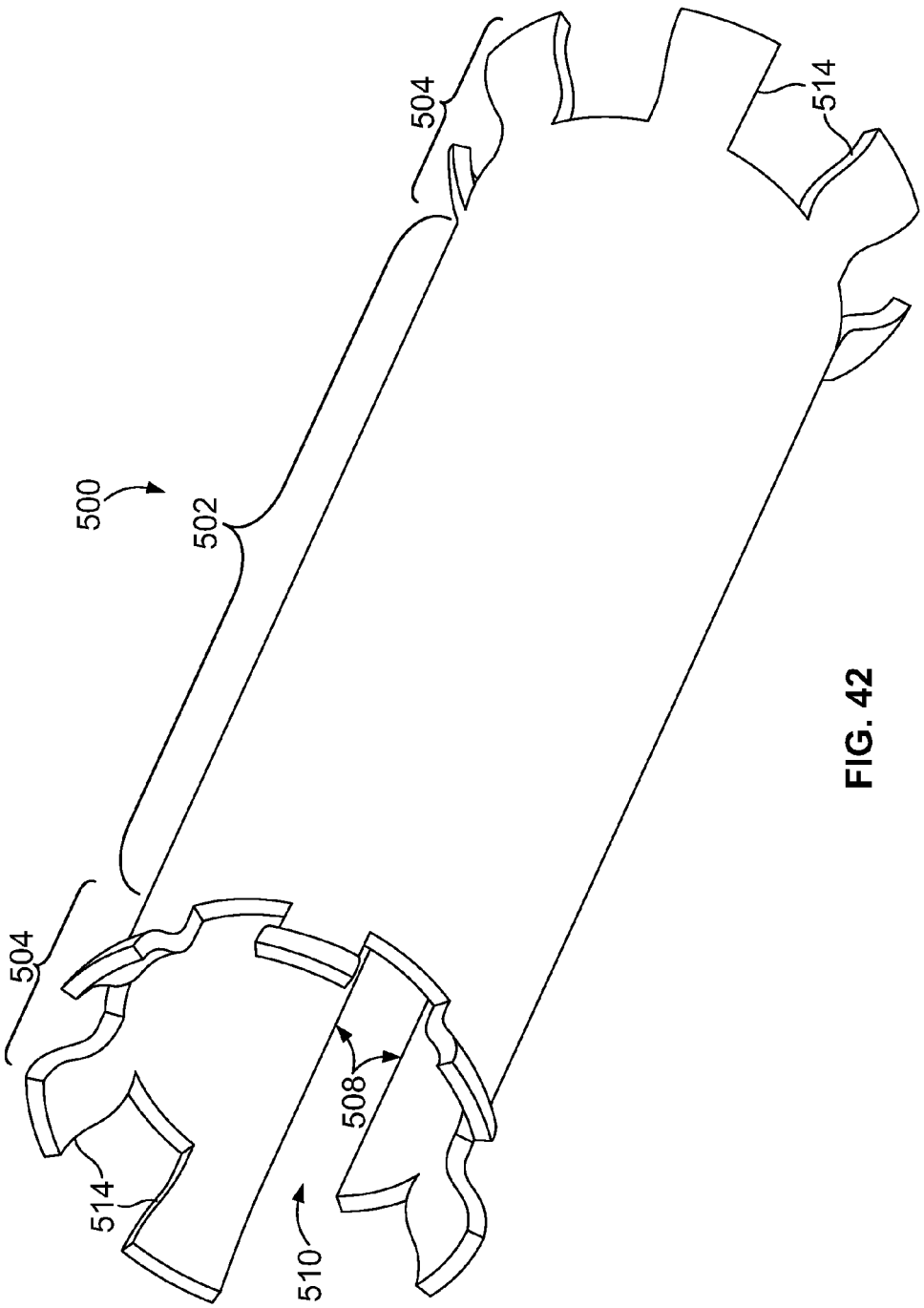
FIG. 42 is a perspective view of a retaining sleeve.
Figure 43:
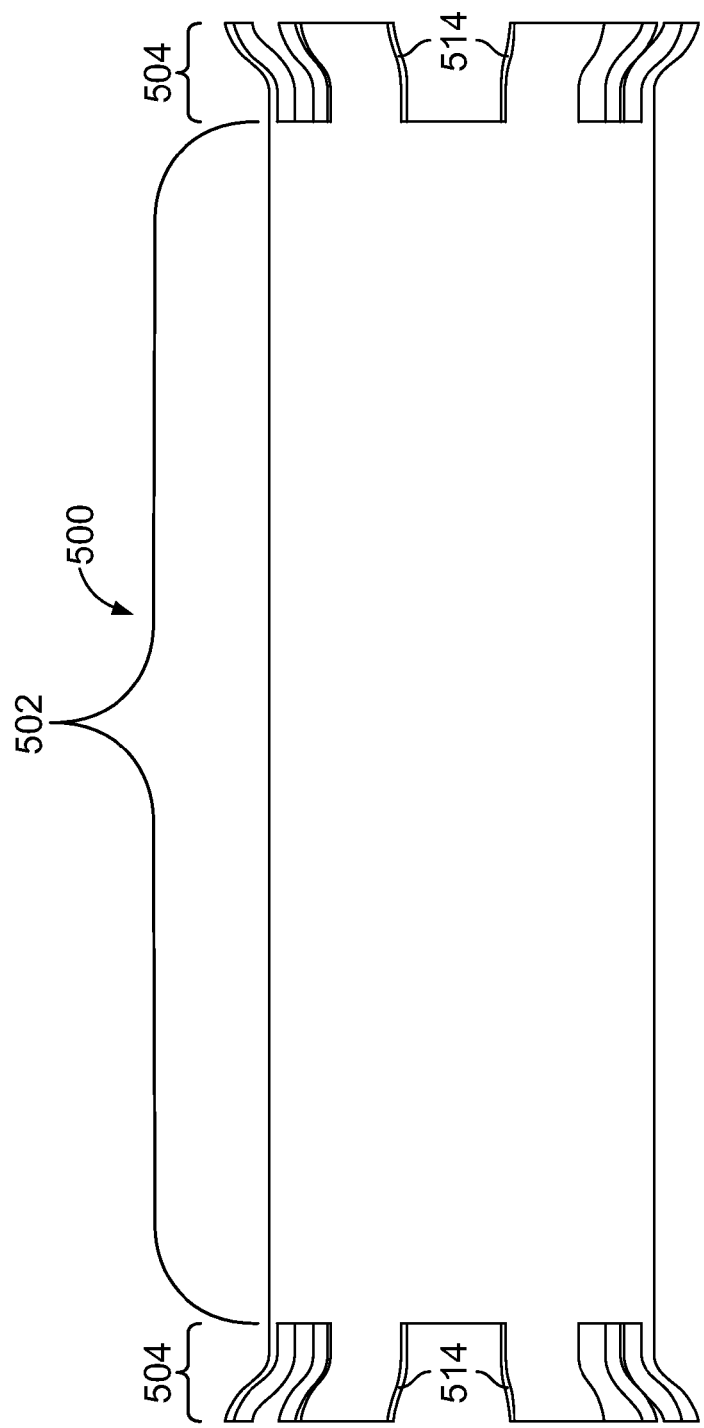
FIG. 43 is a front elevational view of the retaining sleeve of FIG. 42.
Figure 44:
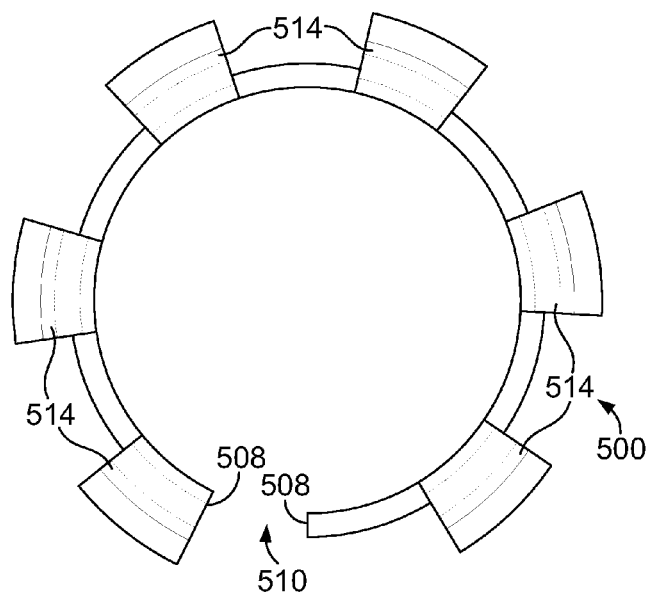
FIG. 44 is an end elevational view of the retaining sleeve of FIG. 42.
Figure 45:
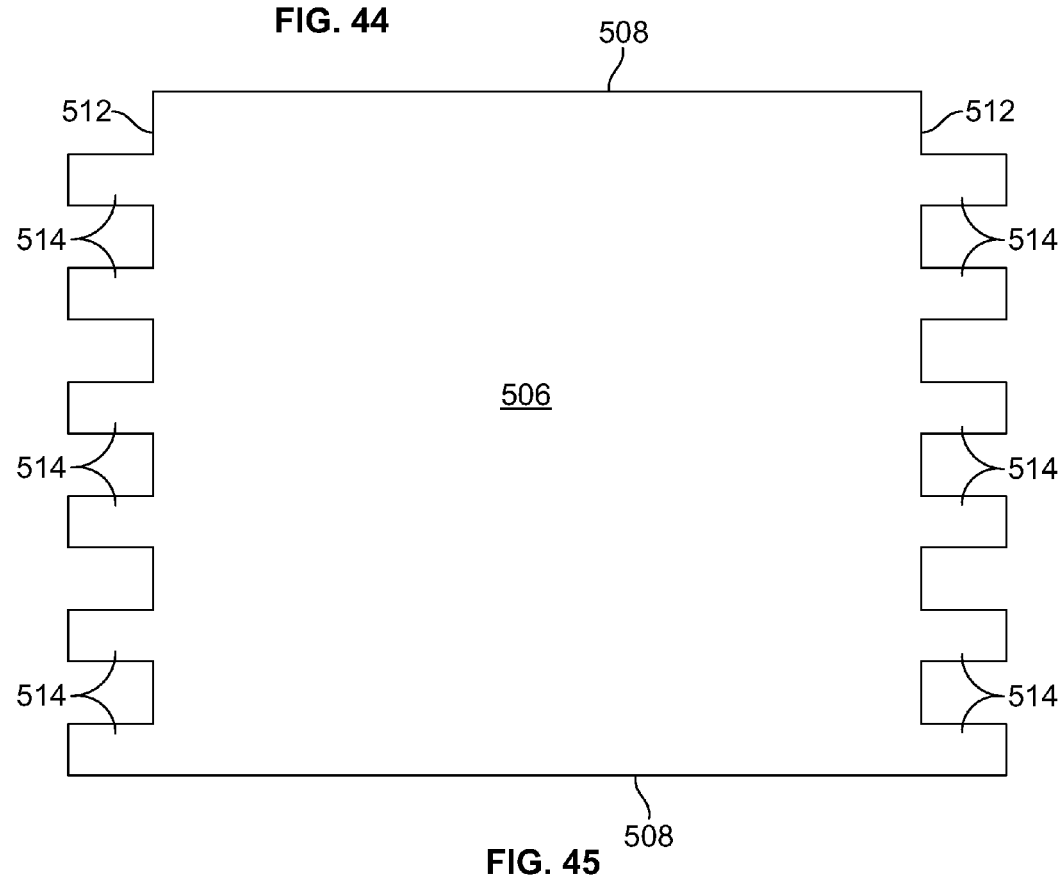
FIG. 45 is a top plan view of a piece of material used to form the retaining sleeve of FIG. 42.
Figure 46:
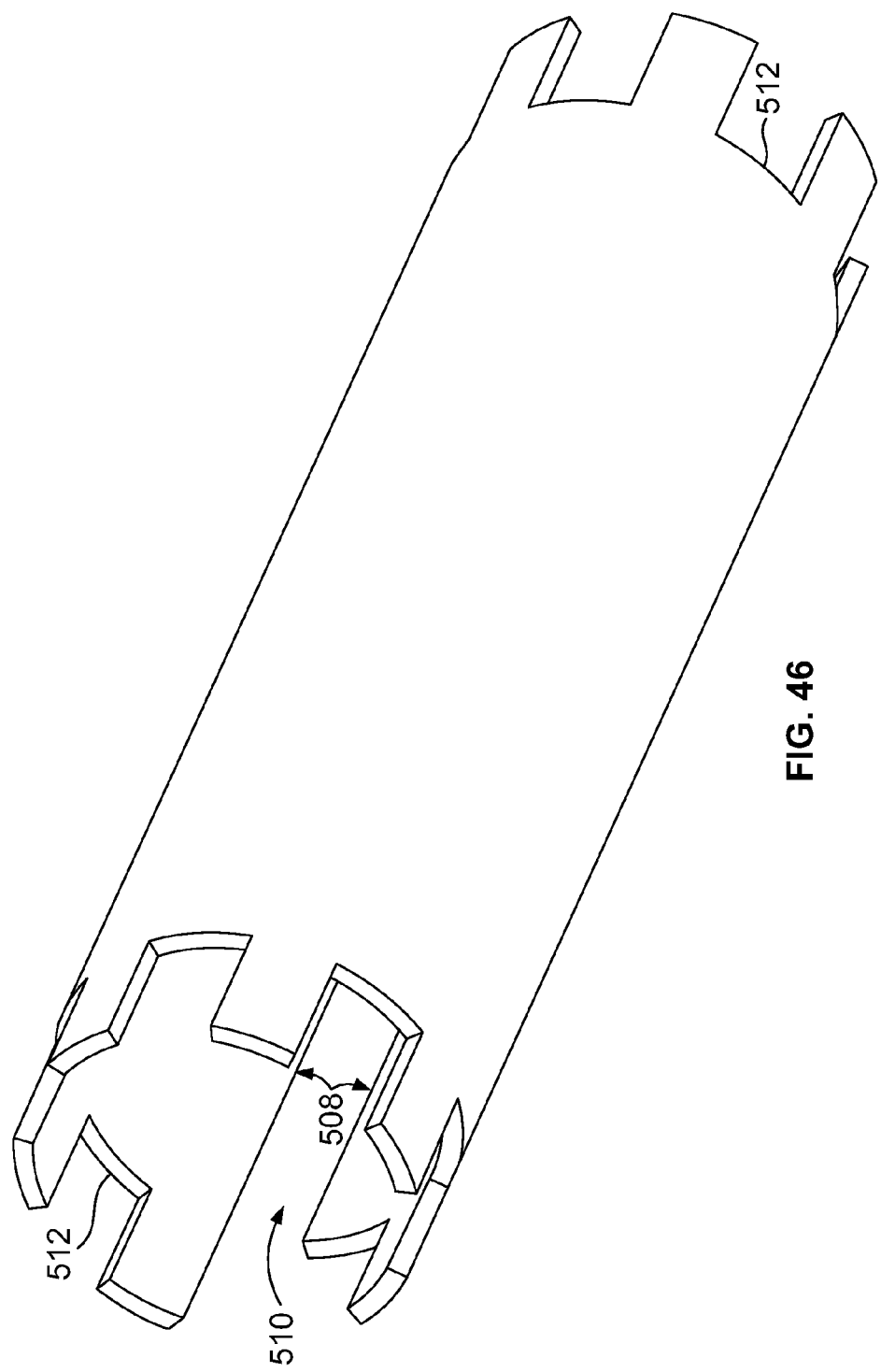
FIG. 46 is a perspective view of the piece of material of FIG. 45, formed into a generally tubular configuration.

According to another aspect of the present disclosure a mechanical fastener assembly or joint may include a retaining sleeve. FIGS. 42-44 illustrate an exemplary retaining sleeve 500, while FIGS. 45 and 46 illustrate the retaining sleeve 500 in partially formed states. While the retaining sleeve 500 will be described herein in the context of a mechanical fastener assembly that is suitable for effectively transforming a bolted joint into a riveted joint, thereby creating a shear joint, it should be understood that retaining sleeves according to the present disclosure may be practiced independently. For example, retaining sleeves according to the present disclosure may be particularly useful in joining workpieces having differently sized aligned bores, regardless of whether the resulting joint is a bolted joint or a shear joint or a riveted joint.

In the illustrated embodiment, the retaining sleeve 500 includes a generally tubular midsection 502 and an enlarged end section 504. Depending on the configuration of the workpieces to be joined, it may be advantageous for the retaining sleeve 500 to have two enlarged end sections 504 separated by the midsection 502, as shown in FIGS. 42 and 43. In the illustrated embodiment, the end sections 504 are substantially identical, but it is within the scope of the present disclosure for the end sections of a retaining sleeve to be differently configured.

In one embodiment, the retaining sleeve 500 is formed from a generally flat or planar piece of material 506 (FIG. 44) that is processed into a tubular configuration (FIG. 45). In the tubular configuration, the facing edges 508 of the material 506 may be spaced from each other to define an axially extending gap 510, rather than being in contact to form a complete tube. In other embodiments, the retaining sleeve 500 may be initially provided as a tube, with the gap 510 being later defined, such as by a cutting operation or the like. In yet other embodiments, the retaining sleeve may be substantially tubular, without an axially extending gap. If a gap 510 is provided between the facing edges 508, the retaining sleeve 500 will have a measure of flexibility, which may vary according to any of a number of factors (e.g., the thickness of the material 506 and the material composition of the retaining sleeve 500). In one embodiment, the retaining sleeve 500 is made of a metallic material, such as steel, but it is within the scope of the present disclosure for the material composition of the retaining sleeve 500 to vary without departing from the scope of the present disclosure.

Each end section 504 has a greater outer diameter than the midsection 502, although the particular dimensions of the midsection 502 and the end sections 504 may vary depending on the nature of the workpieces to be joined. In the illustrated embodiment, the opposing edges 512 of the material 506 are processed (e.g., by a cutting operation or the like) to form with a plurality of deformable projections or teeth or fingers 514. In other embodiments, the deformable projections or teeth or fingers 514 may be separately provided and secured or associated to the midsection 502, rather than being integrally formed with the midsection 502. FIGS. 42 and 43 show the projections 514 as being outwardly bent or disposed (i.e., directed away from the central axis of the retaining sleeve 500), but they may initially have substantially the same outer diameter as the midsection 502 (as shown FIG. 45) or a smaller outer diameter before being outwardly deformed to define a greater diameter than that of the midsection 502. In the illustrated embodiment, the projections 514 are substantially identical and rectangular, but it is also within the scope of the present disclosure for the projections to be non-identical and/or differently shaped (i.e., non-rectangular).

Figure 50:
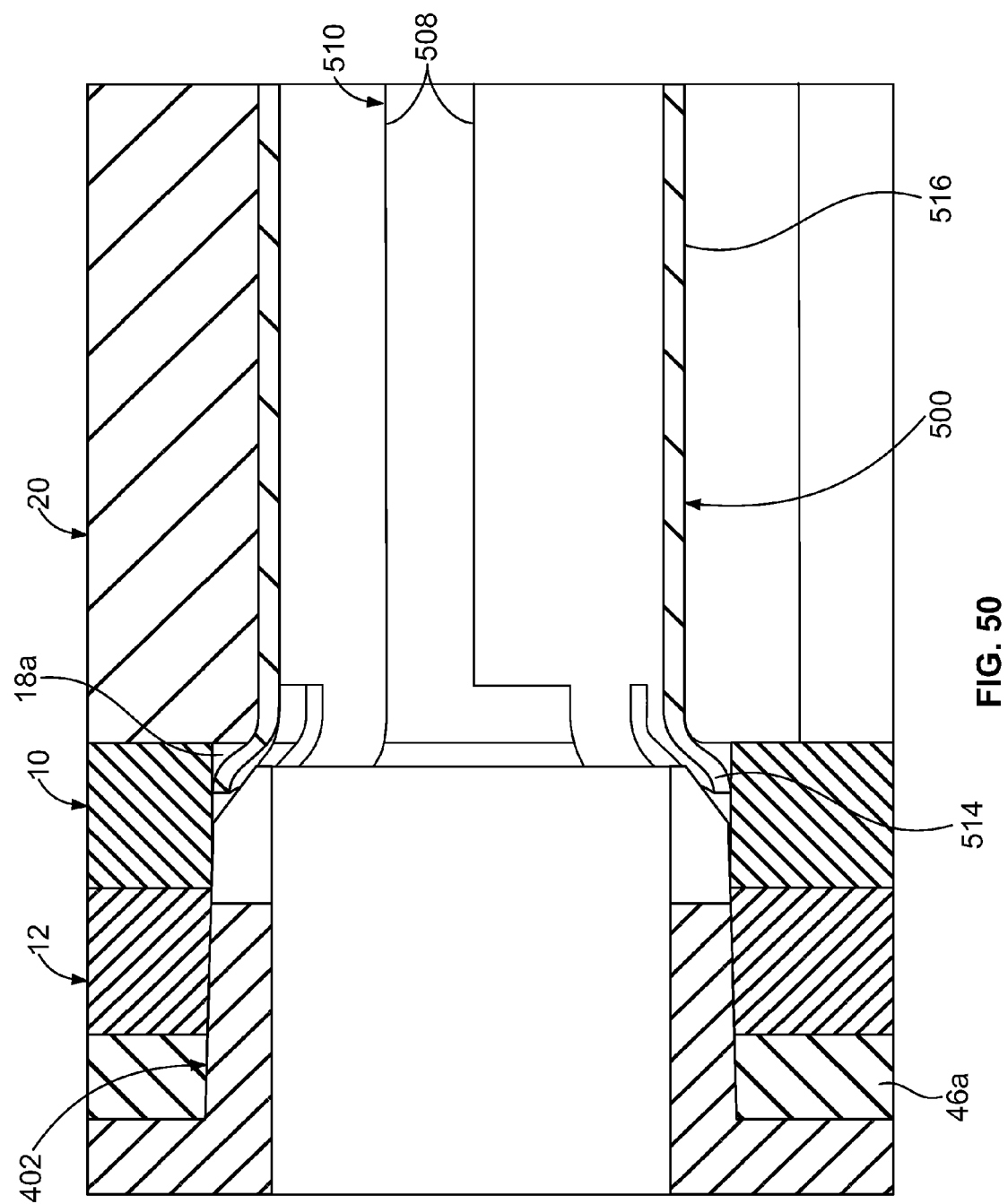
FIG. 50 is a cross-sectional, detail view of the retaining sleeve of FIG. 42 and a slotted insert received within bores of the vehicle axle and suspension system component of FIG. 1.

FIG. 47 illustrates a pair of retaining sleeves 500 received within bores of a first workpiece or vehicle axle 10 of the type described above and illustrated in FIGS. 1-9. As in FIGS. 1-9, a brace or bracket 20 is provided within the interior of the first workpiece 10, extending between the vertical walls 16a and 16b for preventing deformation of the first workpiece 10 when force is applied thereto in joining it with a second workpiece 12 (FIG. 50). Each brace 20 defines a bore 516 into which a retaining sleeve 500 may be inserted, preferably with the projections 514 in the unexpanded or non-deformed configuration of FIG. 46, rather than the expanded or deformed configuration of FIGS. 42-45. If the outer diameter of the retaining sleeve 500 is greater than the diameter of the bore 516, then the diameter of the retaining sleeve 500 may be temporarily decreased (on account of the flexibility provided by the gap 510) to allow the retaining sleeve 500 to be slid through the bore 516.

Each retaining sleeve 500 is advanced through the bore 516 of the associated brace 20 until the projections 514 are positioned at least partially outside of the two ends of the bore 516. In this position, the projections 514 are at least partially received within the bores 18a, 18b of the first workpiece 10, which have a greater diameter than the bore 516 of the brace 20. The projections 514 are then deformed outwardly to come into contact with the bores 18a, 18b of the first workpiece 10 (FIG. 47). The projections 514 in their final expanded configuration serve to hold the first workpiece 10 in place with respect to the brace 20, with the bore 516 of the brace 20 in alignment with the bores 18a, 18b of the first workpiece 10.

Preferably, the projections 514 are each deformed to the same extent, which may improve the alignment between the bore 516 of the brace 20 and the bores 18a, 18b of the first workpiece 10. This may be achieved by any of a number of methods and using any of a number of tools. In one embodiment, a generally annular expansion or deformation device or tool 600 (FIGS. 48 and 49) may be used to move the projections 514 from the unexpanded or non-deformed configuration of FIG. 46 to the deformed or expanded configuration of FIGS. 42-44. One end of the deformation device 600 includes a contoured shoulder 602 having a varying outer diameter. The diameter of the shoulder 602 preferably varies from a minimum which is smaller than the inner diameter of the retaining sleeve 500 in the vicinity of the projections 514 to a maximum diameter that is greater than the inner diameter of the retaining sleeve 500 in the vicinity of the projections 514. Preferably, the maximum diameters of the shoulder 602 and the deformation device 600 are no greater than the diameter of the bores 18a, 18b of the first workpiece 10, to allow the deformation device 600 to be advanced into the bores 18a, 18b to contact the unexpanded or non-deformed projections 514. Pressing the shoulder 602 of the deformation device 600 against the projections 514 causes the projections 514 to deform outwardly until the projections 514 come into contact with the associated bore 18a, 18b of the first workpiece 10 or until the projections 514 reach the maximum deformation as defined by the maximum diameter of the shoulder 602.

With the retaining sleeve 500 in place and the projections 514 in their expanded or deformed configuration, additional components of a mechanical fastener assembly may be provided. For example, FIG. 50 shows a second workpiece 12 of the type described above and illustrated in FIGS. 1-9, with a retaining sleeve 500 spanning the bores of the brace 20 and the first workpiece 10 and a slotted insert 402 spanning the bores of the first and second workpieces 10 and 12. As illustrated, both the slotted insert 402 and the projections 514 of the retaining sleeve 500 are partially received within the bore 18a of the first workpiece 10. It may be preferable for the slotted insert 402 and the projections 514 to be spaced from each other, otherwise the presence of the projections 514 could prevent the slotted insert 402 from pressing against the bore 18a of the first workpiece 10. Other components of a mechanical fastener assembly (e.g., a mechanical fastener) may also be installed to join the workpieces. Additionally, in other embodiments, the slotted insert 402 may be replaced with a slotted collar, or the retaining sleeve 500 may be used in combination with a mechanical fastener assembly omitting a slotted collar or insert.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to a mechanical fastener assembly alone, a mechanical fastener assembly in combination with multiple workpieces to define a joint, individual components of a mechanical fastener assembly, and/or a method of joining multiple workpieces.

The invention claimed is:

1. A mechanical fastener assembly for securing first and second workpieces having aligned bores, the mechanical fastener assembly comprising:
 a mechanical fastener having a shaft configured to be at least partially received within the aligned bores of the first and second workpieces; and
 a slotted insert surrounding at least a portion of the shaft of the mechanical fastener and comprising
  a body portion configured to be at least partially received within the aligned bores of the first and second workpieces and having a free end including at least one slot having a length that is less than a length of the body portion, and
  an enlarged head portion associated with the body portion, configured to be positioned outside of the aligned bores of the first and second workpieces, and including a first surface defining an end of the slotted insert and an opposing second surface facing the body portion, wherein
  an outer surface of the body portion of the slotted insert is tapered from a minimum diameter at the free end to a maximum diameter at the second surface of the head portion and configured to engage at least a portion of the aligned bores of the first and second workpieces, and
  the head portion extends radially outwardly from the body portion.

2. The mechanical fastener assembly of claim 1, wherein the slotted insert includes a plurality of slots.

3. The mechanical fastener assembly of claim 2, wherein at least two of the slots are differently configured.

4. The mechanical fastener assembly of claim 2, wherein the slots are defined in only the body portion of the slotted insert.

5. The mechanical fastener assembly of claim 1, wherein the head portion of the slotted insert is substantially circular.

6. The mechanical fastener assembly of claim 1, wherein the head portion of the slotted insert is non-circular.

7. The mechanical fastener assembly of claim 1, wherein the outer surface of the body portion of the slotted insert includes a knurled section.

8. The mechanical fastener assembly of claim 1, wherein the inner surface of the slotted insert includes a threaded section and an outer surface of the mechanical fastener includes a threaded section configured to mate with the threaded section of the slotted insert.

9. A joint comprising:
 a first workpiece having a first bore;
 a second workpiece having a second bore aligned with the first bore;
 a mechanical fastener having a shaft at least partially received within the aligned bores of the first and second workpieces; and
 a slotted insert surrounding at least a portion of the shaft of the mechanical fastener and comprising
  a body portion at least partially received within the aligned bores of the first and second workpieces and including a plurality of slots entirely received within the aligned bores of the first and second workpieces, and
  an enlarged head portion positioned outside of the aligned bores of the first and second workpieces, wherein an inner surface of the slotted insert engages at least a portion of the shaft of the mechanical fastener and an outer surface of the body portion of the slotted insert engages at least a portion of the aligned bores of the first and second workpieces.

10. The joint of claim 9, wherein at least two of the slots are differently configured.

11. The joint of claim 9, wherein the slots are defined in only the body portion of the slotted insert.

12. The joint of claim 9, wherein the head portion of the slotted insert is substantially circular.

13. The joint of claim 9, wherein the head portion of the slotted insert is non-circular.

14. The joint of claim 9, wherein the outer surface of the body portion of the slotted insert includes a knurled section.

15. The joint of claim 9, wherein the inner surface of the slotted insert includes a threaded section and an outer surface of the mechanical fastener includes a threaded section configured to mate with the threaded section of the slotted insert.

16. A joint comprising:
 a first workpiece having a first bore;
 a second workpiece having a second bore aligned with the first bore;
 a mechanical fastener having a shaft at least partially received within the aligned bores of the first and second workpieces; and
 a slotted insert surrounding at least a portion of the shaft of the mechanical fastener and comprising
  a body portion extending between first and second ends and at least partially received within the aligned bores of the first and second workpieces, and
  an enlarged head portion associated with the second end of the body portion and positioned outside of the aligned bores of the first and second workpieces, wherein an outer surface of the body portion of the slotted insert is tapered from a minimum diameter at the first end of the body portion to a maximum diameter at the second end of the body portion and engages a tapered portion of the aligned bores of the first and second workpieces.

17. The joint of claim 16, wherein the head portion of the slotted insert is substantially circular.

18. The joint of claim 16, wherein the head portion of the slotted insert is non-circular.

19. The joint of claim 16, wherein the outer surface of the body portion of the slotted insert includes a knurled section.

20. The joint of claim 16, wherein the inner surface of the slotted insert includes a threaded section and an outer surface of the mechanical fastener includes a threaded section configured to mate with the threaded section of the slotted insert.

* * * * *